(12) United States Patent
Kim et al.

(10) Patent No.: US 12,028,698 B2
(45) Date of Patent: Jul. 2, 2024

(54) AIR PURIFIER AND METHOD FOR OUTPUTTING SOUND BY AIR PURIFIER

(71) Applicant: SAMSUNG ELECTRONICS CO., LTD., Suwon-si (KR)

(72) Inventors: Kidu Kim, Suwon-si (KR); Jongyuk Lee, Suwon-si (KR); Kwangyoun Kim, Suwon-si (KR); Suho Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 144 days.

(21) Appl. No.: 17/688,009

(22) Filed: Mar. 7, 2022

(65) Prior Publication Data
US 2022/0329964 A1    Oct. 13, 2022

Related U.S. Application Data

(63) Continuation of application No. PCT/KR2022/001925, filed on Feb. 8, 2022.

(30) Foreign Application Priority Data

Apr. 8, 2021 (KR) .................. 10-2021-0046089

(51) Int. Cl.
| | |
|---|---|
| H04S 7/00 | (2006.01) |
| B01D 46/24 | (2006.01) |
| F24F 1/0073 | (2019.01) |
| H04R 1/02 | (2006.01) |
| H04R 5/02 | (2006.01) |
| H04R 5/04 | (2006.01) |
| H04S 1/00 | (2006.01) |

(52) U.S. Cl.
CPC .......... *H04S 7/303* (2013.01); *B01D 46/2403* (2013.01); *F24F 1/0073* (2019.02); *H04R 1/028* (2013.01); *H04R 5/02* (2013.01); *H04R 5/04* (2013.01); *H04S 1/007* (2013.01); *B01D 2279/45* (2013.01); *H04S 2400/13* (2013.01)

(58) Field of Classification Search
None
See application file for complete search history.

(56) References Cited

U.S. PATENT DOCUMENTS

| | | |
|---|---|---|
| 2011/0277982 A1 | 11/2011 | Kim et al. |
| 2018/0256770 A1 | 9/2018 | Jang |

FOREIGN PATENT DOCUMENTS

| | | |
|---|---|---|
| CN | 107917514 A | 4/2018 |
| CN | 211925964 U | 11/2020 |
| CN | 212362263 U | 1/2021 |

(Continued)

OTHER PUBLICATIONS

PCT/ISA/210 dated May 10, 2022 in International Patent Application No. PCT/KR2022/001925.

*Primary Examiner* — Kenny H Truong
(74) *Attorney, Agent, or Firm* — STAAS & HALSEY LLP

(57) ABSTRACT

An air purifier includes a cylindrical filter configured to filter pollutants included in air that enters the air purifier, and a plurality of speakers coupled to a circumference of an outer surface of the cylindrical filter. A communication interface is configured to obtain information from an external device, and a processor is configured to control the plurality of speakers to output an audio signal corresponding to the information.

9 Claims, 21 Drawing Sheets

(56) References Cited

FOREIGN PATENT DOCUMENTS

| | | |
|---|---|---|
| JP | 2005-171838 | 6/2005 |
| JP | 2007-268436 A | 10/2007 |
| JP | 2010-246087 A2 | 10/2010 |
| KR | 10-2004-0003622 | 1/2004 |
| KR | 10-2005-0099402 | 10/2005 |
| KR | 10-2006-0091859 A | 8/2006 |
| KR | 10-2010-0073696 | 7/2010 |
| KR | 10-1016403 B1 | 2/2011 |
| KR | 101837760 B1 * | 1/2017 |
| KR | 10-1872669 B1 | 7/2018 |
| KR | 10-2020-0067461 | 6/2020 |
| KR | 102134284 B1 * | 7/2020 |
| KR | 10-2020-0134052 A | 12/2020 |
| WO | WO-2019050154 A1 * | 3/2019 .............. F24F 1/035 |

\* cited by examiner

AIR PURIFIER AND METHOD FOR OUTPUTTING SOUND BY AIR PURIFIER

CROSS-REFERENCE TO RELATED APPLICATION

This application is a continuation application under 35 U.S.C. § 111(a), of International Patent Application No. PCT/KR2022/001925, filed on Feb. 8, 2022 which claims priority under 35 U. S. C. § 119 to Korean Patent Application No. 10-2021-0046089 filed on Apr. 8, 2021, the disclosures of which are incorporated herein by reference in their entirety.

TECHNICAL FIELD

Embodiments of the disclosure relate to an air purifier and a method of outputting sound through a plurality of speakers included in the air purifier.

BACKGROUND ART

An air purifier is equipment for receiving air, filtering out fine dust (or germs) from the air, and then discharging purified air from the air purifier. Air purifier products use various methods for filtering out dust.

As the problems of fine dust in air became known, in the past, many people made their own air purifiers. However, by 2019, small-sized air purifiers that can filter air for rooms or studio apartments and even micro air purifiers that can filter air for the insides of vehicles or strollers, have been developed. According to purification capacities or sizes and filter grades, various kinds of air purifiers ranging from low-cost types to high-cost types are sold.

Air purifiers were invented at the end of the 19th century to address the need therefor. At that time, industrialization was underway in western society, which worsens air pollution. Accordingly, the need for fresh air began to emerge. An American, Dr. Frederick Gardner Cottrell (Jan. 10, 1877 to Sep. 16, 1948), of Oakland, Calif. invented an electrostatic precipitator for filtering out dust in the air by using static electricity. The electrostatic precipitator was improved to produce an air purifier in the modern sense in the early 20th century for areas impacted by various types of air pollution. Particularly, in the 20th century, technological development took place with the development of aerospace technology in the US and dust collection technology was developed. Also, with the development of long-life, economic filters, more advanced filters began to appear. In addition, air purifiers were developed and demand for air purifiers began to increase. As industrial aspects of advanced countries including the US change, and as buildings increase, the number of people working in closed spaces has increased, and air pollution has intensified. Accordingly, people's need for clean spaces is rising.

Filtration efficiency of an air purifier is represented by clean air delivery rate or CADR, and is certified only by institutions designated by the American National Standards Institute (ANSI). A unit of CADR is purification space per minute ($m^3$/min), and represents a space size that is purified in one minute. That is, CADR means efficiency of quickly purifying polluted air in a preset space, not the amount of fine dust that can be removed. Accordingly, in the case of buying an air purifier for removing fine dust, it is necessary to check filter performance. Filters are graded according to their filtration performance. Grades 10 to 12 are grouped into an EPA grade, grades 13 to 14 are grouped into a HEPA grade, and grades 15 to 17 are grouped into ULPA grade. The grades are indicated by [E10, E11, E12, H13, H14, U15, U16, U17]. Grades 13 or higher can remove fine dust existing in the air by 99.75% or more. However, higher grades are not always better. The reason is because the higher grade cause greater resistance (when the same motor is used), resulting in a smaller air volume. Also, using a larger motor to generate the same air volume, increases noise and power consumption. A larger air volume is advantageous because it can increase the number of air-filtering and cover a wider area. Certification authority (CA)-authenticated use areas are most important indexes for comparing the performances of air purifiers.

Meanwhile, as air purifiers become daily necessities, there are attempts to add various additional functions to air purifiers.

DESCRIPTION OF EMBODIMENTS

Technical Problem

According to an aspect of the disclosure, an air purifier for providing a high quality sound service through a plurality of speakers arranged along a circumference of a cylindrical filter portion, and a method of outputting sound in the air purifier are provided.

Technical Solution to Problem

An air purifier according to an aspect of the disclosure includes a cylindrical filter configured to filter air that enters the cylindrical filter; a plurality of speakers coupled to a circumference of an outer surface of the cylindrical filter; a communication interface configured to receive information from an external device; and a processor configured to control the plurality of speakers to output an audio signal corresponding to the information.

In the air purifier according to an aspect of the disclosure the plurality of speakers may be arranged in such a way as to be in contact with the cylindrical filter with largest contact areas.

In the air purifier according to an aspect of the disclosure the information may include stereophonic sound information, and the processor may be further configured to control the plurality of speakers to output a stereophonic audio signal corresponding to the stereophonic sound information.

The air purifier according to an aspect of the disclosure may include a sensor coupled to the processor and configured to sense a user's location.

In the air purifier according to an aspect of the disclosure the plurality of speakers may include a first speaker, a second speaker, and a third speaker, and the sensor may include a human body sensor, and the processor may be further configured to control the first speaker to output a left sound signal, control the second speaker to output a right sound signal, and control the third speaker to output a mono sound signal, based on the user's location sensed by the human body sensor.

In the air purifier according to an aspect of the disclosure the processor may be further configured to adjust an output intensity of each of the plurality of speakers based on the user's location sensed by the sensor.

In the air purifier according to an aspect of the disclosure the processor may be further configured to, when the first speaker and the second speaker of the plurality of speakers are determined to be speakers located closest to the user's location, increase output intensities of the first speaker and the second speaker, and reduce an output intensity of the third speaker.

In the air purifier according to an aspect of the disclosure the plurality of speakers may include a plurality of full-range speakers, the air purifier may further include a woofer speaker coupled below the cylindrical filter portion.

In the air purifier according to an aspect of the disclosure the processor may be further configured to determine a change of an air volume output by the air purifier, determine a change in noise level based on the change of the air volume, and adjust output intensities of the plurality of speakers based on the determined change in noise level.

In the air purifier according to an aspect of the disclosure the processor may be further configured to determine a frequency band of a changed noise level of the air purifier based on a change in air volume output by the air purifier, and to adjust an output intensity of the audio signal based on the determined frequency band.

In a method of outputting an audio signal from an air purifier including a cylindrical filter configured to filter air which enters the cylindrical filter according to an aspect of the disclosure, the method may include obtaining stereophonic information from an external device, determining, using a processor, a first speaker from among a plurality of speakers coupled to a circumference of an outer surface of the cylindrical filter to be a right channel speaker and determining a second speaker from among the plurality of speakers to be a left channel speaker, outputting a right audio signal through the first speaker, based on the stereophonic information, and outputting a left audio signal through the second speaker, based on the stereophonic information.

In the method according to an aspect of the disclosure the plurality of speakers may be arranged in such a way as to be in contact with the cylindrical filter with largest contact areas.

In the method according to an aspect of the disclosure the method may include sensing a user's location through a sensor included in the air purifier.

In the method according to an aspect of the disclosure the sensor may be a human body sensor and the determining of the first speaker to be the right channel speaker and the second speaker to be the left channel speaker may include determining the first speaker and the second speaker from among the plurality of speakers to be speakers located closest to the user, based on the user's location sensed through the human body sensor, and determining the first speaker and the second speaker determined to be the speakers located closest to the user to be the right channel speaker and the left channel speaker, respectively.

In the method according to an aspect of the disclosure determining a third speaker from among the plurality of speakers to be a mono channel speaker, based on the user's location sensed through the human body sensor, and outputting a mono sound signal through the third speaker, based on the stereophonic information.

An air purifier according to another aspect of the disclosure includes a cylindrical filter configured to filter air passing through the cylindrical filter, a plurality of speakers coupled to an outer surface of the cylindrical filter, an interface configured to receive information from an external device, a sensor configured to sense a user's location, and a processor coupled to the interface and the sensor and configured to: control the plurality of speakers to output an audio signal corresponding to the information, control the plurality of speakers to adjust the audio signal based on output by the plurality of speakers based on the user's location; determine a change in a noise level produced by the air purifier based on a change in air volume output by the air purifier; and adjust the audio signal output by the plurality of speakers based on the change in noise level.

In the air purifier according to an aspect of the disclosure the control of the processor to adjust the audio signal output by the plurality of speakers may include adjusting the output intensity of each of the speakers.

BRIEF DESCRIPTION OF DRAWINGS

The above and other aspects, features and advantages of certain aspects of the present disclosure will be more apparent from the following detailed description taken in conjunction with the accompanying drawings, in which.

MODE OF DISCLOSURE

Figure 1:
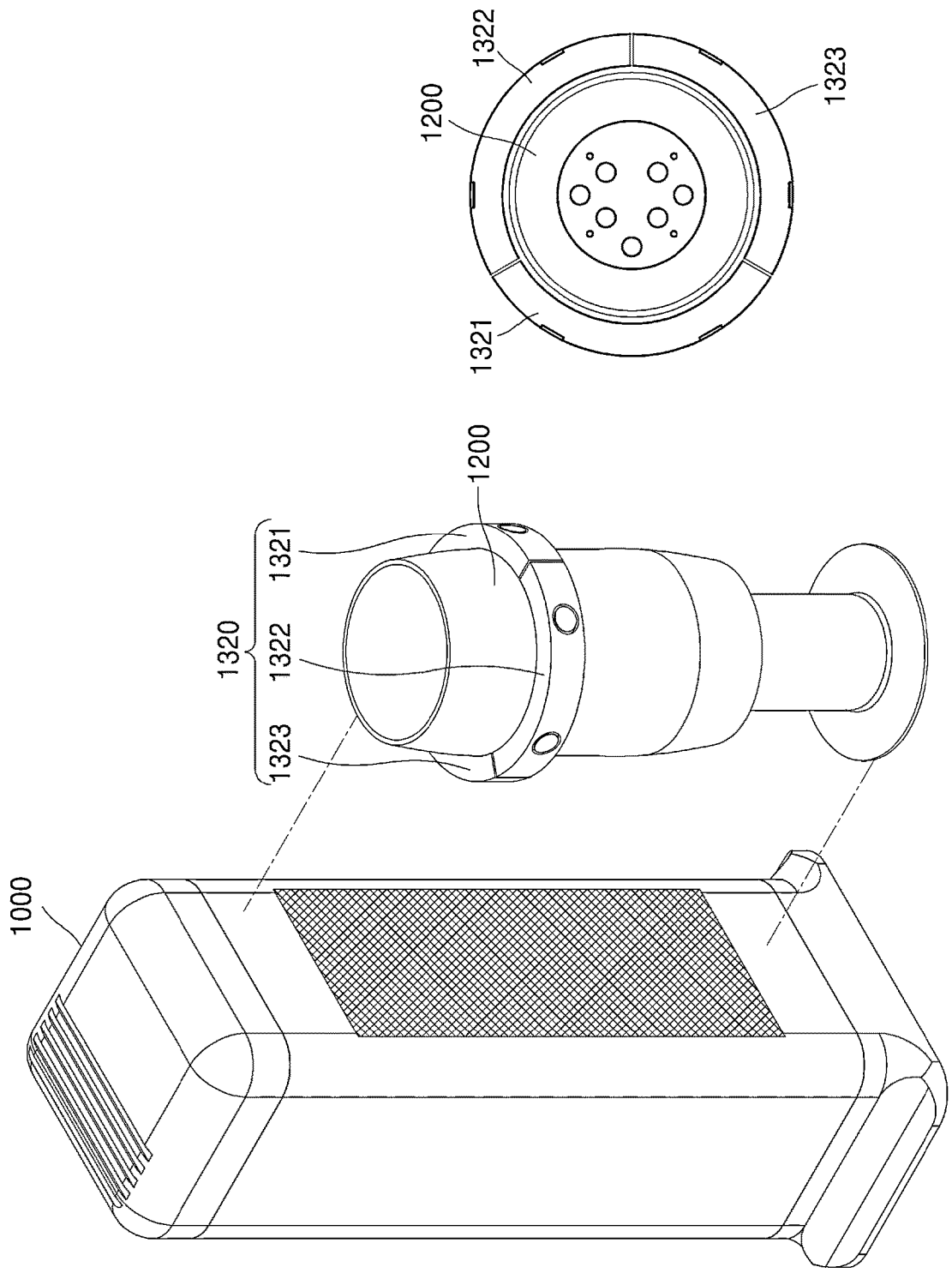
FIG. 1 is a view illustrating an air purifier according to an aspect of the disclosure.

Terms used in this specification will be briefly described, and the disclosed embodiments will be described in detail.

Although general terms being widely used in the present specification were selected as terminology used in the disclosure while considering the functions of the disclosure, they may vary according to intentions of one of ordinary skill in the art, judicial precedents, the advent of new technologies, and the like.
Throughout the disclosure, the expression "at least one of a, b or c" indicates only a, only b, only c, both a and b, both a and c, both b and c, all of a, b, and c, or variations thereof. Terms arbitrarily selected by the applicant of the disclosure may also be used in a specific case. In this case, their meanings will be described in detail in the detailed description of the disclosure. Hence, the terms must be defined based on the meanings of the terms and the contents of the entire specification, not by simply stating the terms themselves.

It will be understood that when a certain part "includes" a certain component, the part does not exclude another component but can further include another component, unless the context clearly dictates otherwise. As used herein, the terms "portion", "module", etc. refers to a unit that can perform at least one function or operation, and may be implemented as hardware, software, or a combination of hardware and software.

Hereinafter, embodiments of the disclosure will be described in detail with reference to the accompanying drawings so that the disclosure may be readily implemented by one of ordinary skill in the technical field to which the disclosure pertains. However, the disclosure is not restricted by these embodiments but can be implemented in many different forms. Also, for definite descriptions of the embodiments of the disclosure, parts irrelevant to descriptions are not shown in the drawings, and throughout the disclosure, similar portions are assigned similar reference numerals.

According to an aspect of the disclosure, an air purifier may attenuate vibrations generated from a plurality of speakers by outputting sound by using the plurality of speakers. Particularly, the air purifier according to an aspect of the disclosure may enable a user to stably hear undistorted sound in all directions by outputting sound through the plurality of speakers arranged at 360 degrees along a circumference of an outer surface of a cylindrical filter portion.

Also, the air purifier according to an aspect of the disclosure may provide a stereophonic service through the plurality of speakers, and particularly, the air purifier may provide a high quality stereophonic service based on a user's location.

FIG. 1 is a view illustrating an air purifier according to an aspect of the disclosure An air purifier 1000 according to an embodiment of the disclosure may be an electronic device that purifies indoor air. For example, the air purifier 1000 may inhale air from outside, remove pollutants from the inhaled air, and discharge purified air. According to an embodiment of the disclosure, the air purifier 1000 may be one of various types. For example, the air purifier 1000 may be a cylindrical type, a square pillar type, or a triangular prism type, although not limited thereto. According to an embodiment of the disclosure, the air purifier 100 may have one of various sizes.

The air purifier 1000 according to an embodiment of the disclosure may include a filter 1200 or a filter portion 1200. The filter portion 1200 may be used to filter out pollutants included in air entering the inside of the air purifier 1000. For example, the filter portion 1200 may remove pollutants included in air entering the inside of the air purifier 1000 by absorbing the pollutants.

According to an embodiment of the disclosure, the filter portion 1200 may include a plurality of filters. For example, the filter portion 1200 may include various kinds of filters, such as a prefilter, a high efficiency particulate air (HEPA) filter, a deodorization filter, etc., although not limited thereto. The filter portion 1200 will be described in detail with reference to FIGS. 4 and 5 below.

According to an embodiment of the disclosure, the filter portion 1200 may be a cylindrical filter. When the filter portion 1200 is a cylindrical filter, the air purifier 1000 may discharge purified air at 360 degrees, and have non-directivity. Also, when the filter portion 1200 is a cylindrical filter, the filter portion 1200 may filter a larger amount of dust than a plate type filter. Hereinafter, a case in which the filter portion 1200 is a cylindrical type will be described as an example. Accordingly, hereinafter, the filter portion 1200 is also referred to as a cylindrical filter portion 1200 or cylindrical filter 1200.

According to an embodiment of the disclosure, the air purifier 1000 may include a plurality of speakers 1320 for outputting sound. In this case, the plurality of speakers 1320 may be full-range speakers, although not limited thereto. A full-range speaker means a speaker that reproduces a full audible frequency band (for example, 20 Hz to 20 kHz). According to an embodiment of the disclosure, the full-range speaker may be in charge of a mid-bandwidth and a high-bandwidth having fast vibrations and small vibration widths. When the plurality of speakers 1320 are full-range speakers, the air purifier 1000 may further include a woofer speaker. The woofer speaker may be a speaker that outputs a low tone. For example, the woofer speaker may output a low tone (mainly, 40 Hz to 500 Hz) of 3 kHz or lower in an audible frequency area. An embodiment in which the air purifier 1000 includes a woofer speaker will be described in detail with reference to FIG. 3, later.

According to an embodiment of the disclosure, the plurality of speakers 1320 may be arranged along a circumference of the cylindrical filter portion 1200. According to an embodiment of the disclosure, the plurality of speakers 1320 may be positioned at an upper end of the cylindrical filter portion 1200, although not limited thereto. When the plurality of speakers 1320 are positioned at the upper end of the cylindrical filter portion 1200, a location at which sound is output may be close to a user's ears, and accordingly, the plurality of speakers 1320 may efficiently transfer sound to the user.

Figure 2:
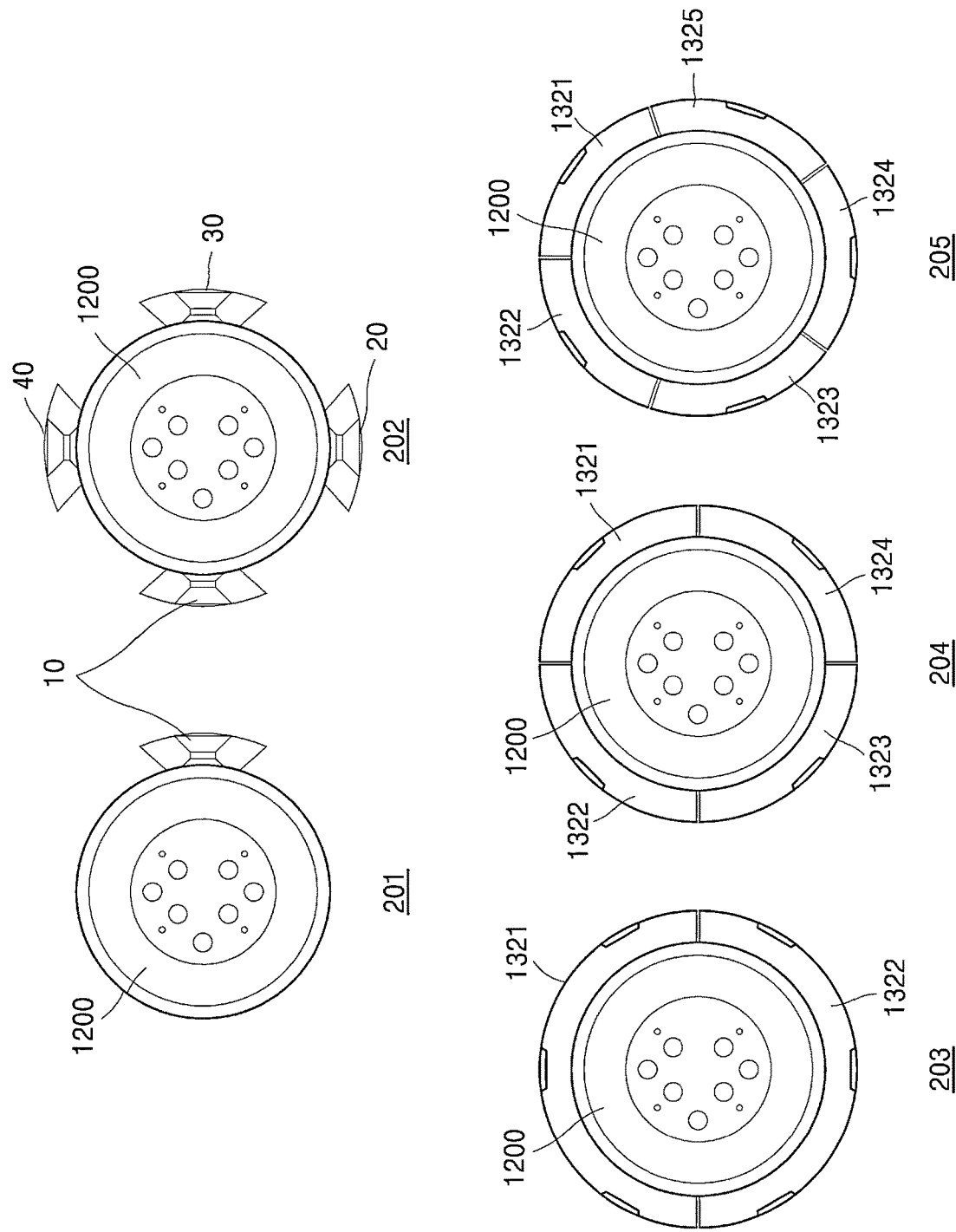
FIG. 2 is a view illustrating a plurality of speakers included in an air purifier, according to an aspect of the disclosure.

Meanwhile, referring to arrangement 201 of FIG. 2, when a speaker 10 is installed at one side of the air purifier 1000, there may be a problem that vibrations from the air purifier 1000 are amplified to one side, according to vibrations of a cone paper, generated from the speaker 10. For example, when the speaker 10 is installed at a left side of the cylindrical filter portion 1200, left-right vibrations may be additionally generated at the left side by the speaker 10 while up-down vibrations are generated by an operation of a motor of the air purifier 1000. Therefore, vibrations at the left side of the air purifier 1000 may be amplified. However, according to an embodiment of the disclosure, when the air purifier 1000 includes the plurality of speakers 1320, vibrations generated from the plurality of speakers 1320 may be cancelled.

When the speaker 10 is installed at a front portion of the air purifier 1000, a user may hear distorted sound behind the air purifier 1000. However, when the plurality of speakers 1320 are arranged along the circumference of the cylindrical filter portion 1200, as in an embodiment of the disclosure, a user may hear undistorted sound in all directions from the air purifier 1000.

According to an embodiment of the disclosure, the plurality of speakers 1320 may be arranged in such a way to be in contact with the cylindrical filter portion 1200 with largest contact areas. When the plurality of speakers 1320 are arranged at regular intervals on the entire 360 degrees area of the cylindrical filter portion 1200 in such a way to be in close contact with the cylindrical filter portion 1200 with the large contact areas, a major portion of vibrations generated from the plurality of speakers 1320 may be cancelled. Referring to arrangement 202 of FIG. 2, when speakers 10, 20, 30, and 40 are positioned at wide intervals, although the speakers 10, 20, 30, and 40 are arranged along the circumference of the cylindrical filter portion 1200, a major portion of vibrations generated from the speakers 10, 20, 30, and 40 may not be cancelled. Accordingly, according to an embodiment of the disclosure, enclosures of the plurality of speakers 1320 may be arranged in such a way to be in contact with the cylindrical filter portion 1200 with largest contact areas.

According to an embodiment of the disclosure, the plurality of speakers 1320 may include a first speaker 1321, a second speaker 1322, and a third speaker 1323. In this case, the air purifier 1000 may output a stereophonic audio signal by using the plurality of speakers 1320. Stereophonic sound means sound obtained by adding spatial information to sound. Stereophonic sound enables a listener not located in a space in which a sound source is generated to perceive, when hearing the sound, a sense of direction, a sense of distance, and a sense of space. For example, the air purifier 1000 may use the first speaker 1321 as a left channel speaker (or a right channel speaker), the second speaker 1322 as a right channel speaker (or a left channel speaker, and the third speaker 1323 as a mono channel speaker. However, the plurality of speakers 1320 are not limited to three. For example, the plurality of speakers 1320 may be two, four, five, six, or more. The number of the plurality of speakers 1320 will be described in detail with reference to FIG. 2, later. However, for convenience of description, a case in which the air purifier 1000 includes three speakers will be described as a main example.

According to an embodiment of the disclosure, each of the plurality of speakers 1320 may include a plurality of units, although not limited thereto. For example, the first speaker 1320 may output sound by using two units. When each of the plurality of speakers 1320 includes a plurality of units, a user may hear more uniform sound in various directions from the air purifier 1000.

According to an embodiment of the disclosure, the air purifier 1000 may provide high quality sound to a user by using the plurality of speakers 1320 arranged along the circumference of the cylindrical filter portion 1200. At this time, the air purifier 1000 may provide sound based on the user's location. For example, the air purifier 1000 may determine roles of the plurality of speakers 1320 or adjust a volume of each of the plurality of speakers 1320, based on a user's location. An operation of providing sound based on a user's location in the air purifier 1000 will be described in detail with reference to FIGS. 7 to 9 below.

Hereinafter, a structure of the air purifier 1000 including the plurality of speakers 1320, according to an embodiment of the disclosure, will be described in more detail with reference to FIGS. 2 to 5.

FIG. 2 is a view illustrating a plurality of speakers included in an air purifier, according to an aspect of the disclosure.

Referring to arrangement 203 of FIG. 2, the air purifier 1000 according to an embodiment of the disclosure may include two speakers 1321 and 1322. Each of the two speakers 1321 and 1322 may occupy a portion of 180 degrees along the circumference of the cylindrical filter portion 1200. The air purifier 1000 may use a first speaker 1321 of the two speakers 1321 and 1322 as a left channel speaker (or a right channel speaker), and a second speaker 1322 as a right channel speaker (or a left channel speaker) to output a stereophonic signal. According to an embodiment of the disclosure, each of the first speaker 1321 and the second speaker 1322 may include a plurality of units. The plurality of units may be two, three, four, or more, although not limited thereto.

Referring to arrangement 204 of FIG. 2, the air purifier 1000 according to an embodiment of the disclosure may include four speakers 1321, 1322, 1323, and 1324. Each of the four speakers 1321, 1322, 1323, and 1324 may occupy a portion of 90 degrees along the circumference of the cylindrical filter portion 1200. According to an embodiment of the disclosure, the air purifier 1000 may use the first speaker 1321 of the four speakers 1321, 1322, 1323, and 1324 as a left channel speaker (or a right channel speaker), the second speaker 1322 as a right channel speaker (or a left channel speaker), and the third channel speaker 1322 and a fourth speaker 1324 as mono channel speakers to output a stereophonic signal. According to another embodiment of the disclosure, the air purifier 1000 may use the first speaker 1321 and the second speaker 1322 of the four speakers 1321, 1322, 1323, and 1324 as left channel speakers (or right channel speakers), and the third speaker 1323 and the fourth speaker 1324 as right channel speakers (or left channel speakers) to output a stereophonic signal.

According to an aspect of the disclosure, each of the first speaker 1321, the second speaker 1322, the third speaker 1323, and the fourth speaker 1324 may include a single unit, although not limited thereto.

Referring to arrangement 205 of FIG. 2, the air purifier 1000 may include five speakers 1321, 1322, 1323, 1324, and 1325. In this case, each of the five speakers 1321, 1322, 1323, 1324, and 1325 may occupy a portion of 72 degrees along the circumference of the cylindrical filter portion 1200. According to an embodiment of the disclosure, the air purifier 1000 may use the first speaker 1321 of the five speakers 1321, 1322, 1323, 1324, and 1325 as a left channel speaker (or a right channel speaker), the second speaker 1322 as a right channel speaker (or a left channel speaker), and the third channel speaker 1322, the fourth speaker 1324, and a fifth speaker 1325 as mono channel speakers to output a stereophonic signal. According to another embodiment of the disclosure, the air purifier 1000 may use the first speaker 1321 and the second speaker 1322 of the five speakers 1321, 1322, 1323, 1324, and 1325 as left channel speakers (or right channel speakers), the third speaker 1323 and the fourth speaker 1324 as right channel speakers (or left channel speakers), and the fifth speaker 1325 as a mono channel speaker to output a stereophonic signal.

According to an embodiment of the disclosure, each of the first speaker 1321, the second speaker 1322, the third speaker 1323, the fourth speaker 1324, and the fifth speaker 1325 may include a single unit, although not limited thereto.

Meanwhile, the air purifier 1000 may include six speakers or more, however, for convenience of description, a case in which the air purifier 1000 includes three speakers will be described as a main example.

Figure 3:
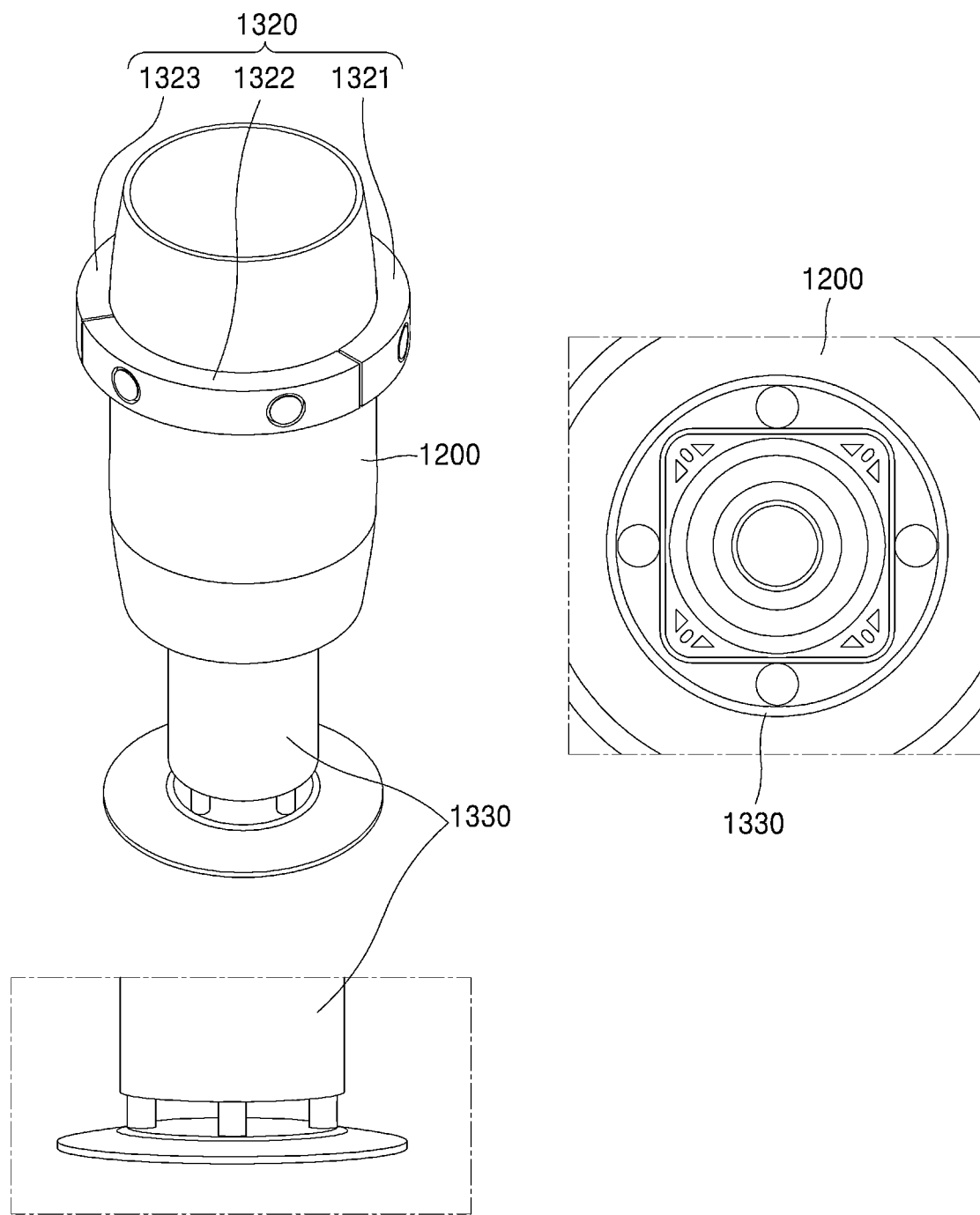
FIG. 3 is a view illustrating an air purifier including a woofer speaker, according to an aspect of the disclosure.

FIG. 3 is a view illustrating an air purifier including a woofer speaker, according to an aspect of the disclosure.

According to an embodiment of the disclosure, the plurality of speakers 1320 arranged along the circumference of the cylindrical filter portion 1200 may be full-range speakers. At this time, the air purifier 1320 may further include a woofer speaker 1330 below the cylindrical filter portion 1200. The woofer speaker 1330 may have a great vibrating amplitude of a cone paper, and may be in charge of a low tone of 300 Hz or lower, having small loss according to sound reflection. The woofer speaker 1330 may emit sound downward. When the air purifier 1000 further includes the woofer speaker 1330, the air purifier 1000 may provide a richer stereophonic service to a user. For example, the air purifier 1000 may output sound of a mid-bandwidth or a high-bandwidth through the full-range speakers arranged along the circumference of the cylindrical filter portion 1200, and output sound of a low-bandwidth through the woofer speaker 1330 positioned below the cylindrical filter portion 1200.

Figure 4:
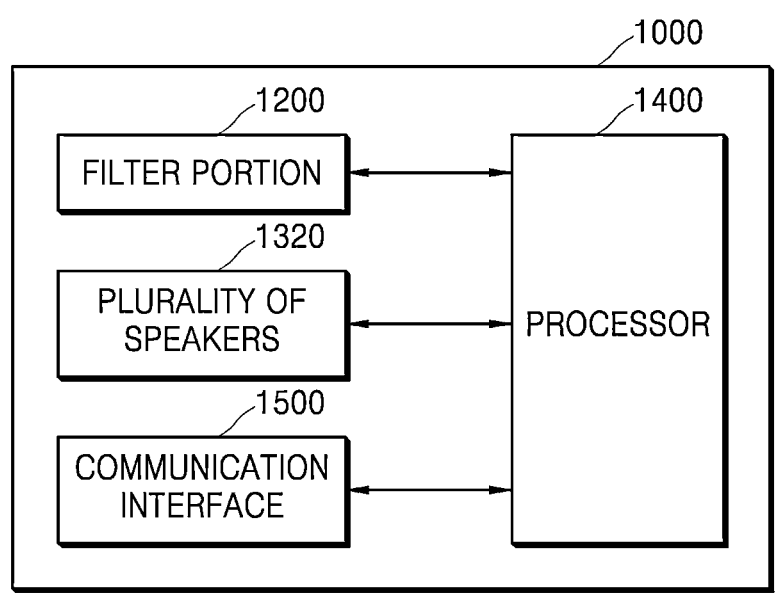
FIG. 4 is a block diagram illustrating a function of an air purifier according to an aspect of the disclosure.
Figure 5:
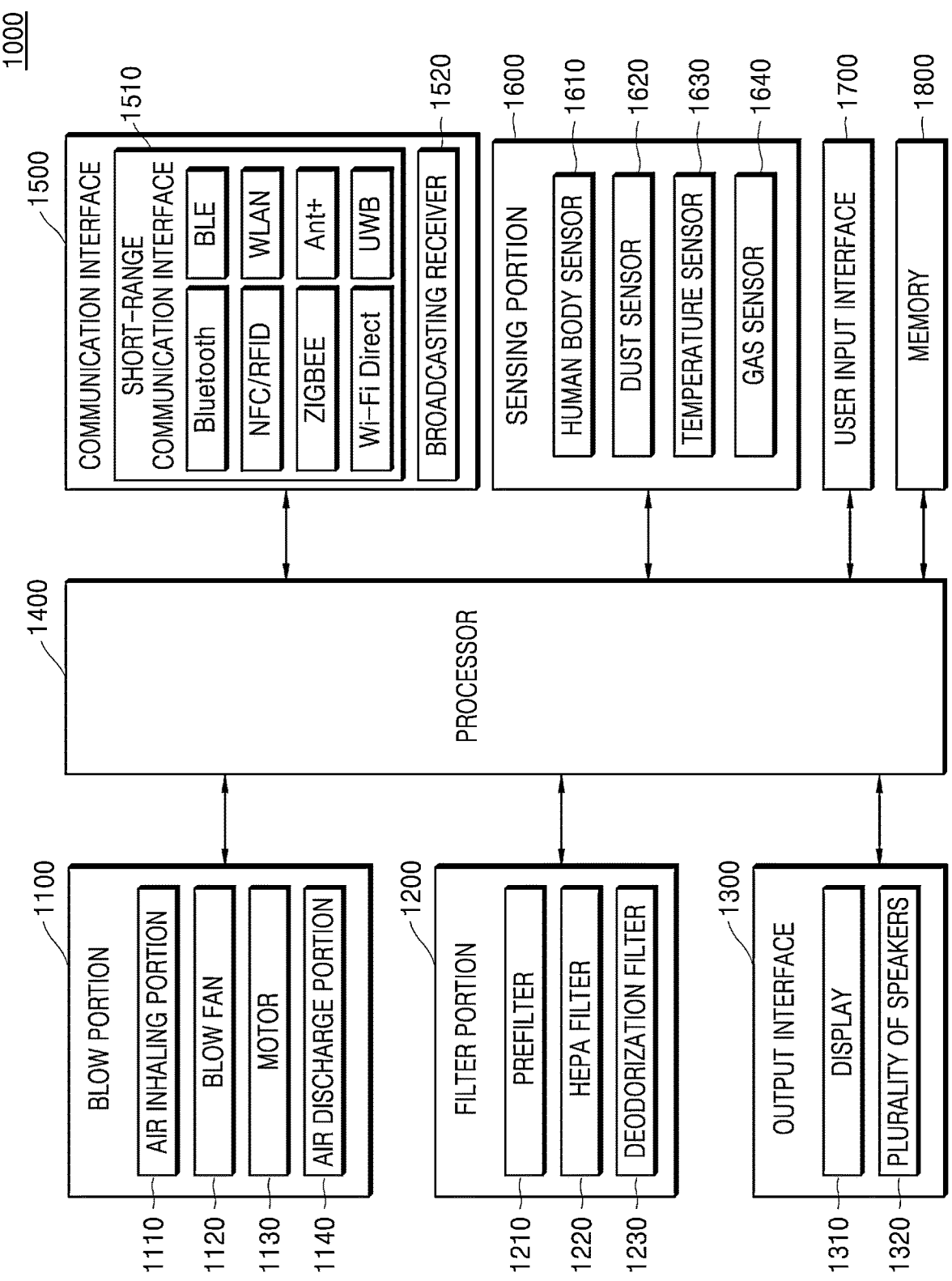
FIG. 5 is a block diagram illustrating a function of an air purifier according to an aspect of the disclosure.

FIGS. 4 and 5 are block diagrams illustrating a function of an air purifier according to an aspect of the disclosure.

As shown in FIG. 4, the air purifier 1000 according to an embodiment of the disclosure may include the filter portion 1200, the plurality of speakers 1320, a processor 1400, and a communication interface 1500. However, all of the components shown in FIG. 4 are not necessarily indispensable components. The air purifier 1000 may be configured with more components than those shown in FIG. 4 or with less components than those shown in FIG. 4. For example, the air purifier 1000 according to an embodiment of the disclosure may be configured with the filter portion 1200, the plurality of speakers 1320, and the processor 1400. Also, as illustrated in FIG. 5, the air purifier 1000 according to an embodiment of the disclosure may include a blow portion 1100, the filter portion 1200, an output interface 1300, the processor 1400, the communication interface 1500, a sensing portion 1600, a user input interface 1700, and a memory 1800.

Hereinafter, the above-mentioned components will be described.

The blower 1100 or blow portion 1100 may include an air inhaling portion 1110, a blow fan 1120, a motor 1130, and an air discharge portion 1140, although not limited thereto. The air inhaling portion 1110 may inhale surrounding air of the air purifier 1000. The blow fan 1120 may form a flow of air to cause outside air to enter the inside of the air purifier 1000 through the air inhaling portion 1110. Meanwhile, the blow fan 1120 may cause air purified through the filter portion 1200 to be discharged to outside of the air purifier 1000 through the air discharge portion 1140. The blow fan 1120 may form a flow of air by rotating by the motor 1130. Revolutions per minute (RPM) of the motor 1130 may be adjusted according to a control by the processor 1400.

The filter 1200 or filter portion 1200 may be configured with at least one filter and coupled with an inner side of a case main body. The filter portion 1200 may be positioned close to the air inhaling portion 1110 of the air purifier 1000, and filter out pollutants included in air entered through the air inhaling portion 1110. According to an embodiment of the disclosure, the filter portion 1200 may be a cylindrical type.

According to an embodiment of the disclosure, the filter portion 1200 may include a plurality of filters. For example, the filter portion 1200 may include a prefilter 1210, a HEPA filter 1220, and a deodorization filter 1230, although not limited thereto. For example, the filter portion 1200 may further include various kinds of functional filters.

The prefilter 1210 may be a filter for removing relatively large particles. For example, the prefilter 1210 may remove large dust, hair, pets' fur, etc. The HEPA filter 1220 may remove various kinds of germ, such as fine dust, ticks, virus, and mold. The deodorization filter 1230 may remove various bad smell, harmful gases, etc. of an indoor space. The deodorization filter 1230 is also referred to as a carbon filter. The functional filters (not shown) may be used to remove pollen, house ticks, germ, bacteria, etc. The functional filters (not shown) may include an antibacterial filter, a carbon filter, etc. The output interface 1300 may be used to output an audio signal or a video signal.

The output interface 1300 may include a display 1310 and the plurality of speakers 1320. According to an embodiment of the disclosure, the plurality of speakers 1320 may include a full-range speaker, a woofer speaker, etc., although not limited thereto. According to an embodiment of the disclosure, the full-range speakers may be arranged along the circumference of the cylindrical filter portion 1200, and the woofer speaker may be positioned below the cylindrical filter portion 1200.

When the display 1310 and a touch pad form a layered structure to be configured as a touch screen, the display 1310 may be used as an input device, as well as an output device. The display 1310 may include at least one of a liquid crystal display, a thin film transistor-liquid crystal display, an organic light-emitting diode, a flexible display, a three-dimensional (3D) display, or an electrophoretic display. Also, according to an implementation type of the air purifier 1000, the air purifier 1000 may include two or more displays 1310.

The plurality of speakers 1320 may output audio signals based on audio data that is received from the communication interface 1500 or stored in the memory 1800. The plurality of speakers 1320 may output a stereophonic signal. For example, the plurality of speakers 1320 may be implemented as at least one of a right channel speaker, a left channel speaker, or a mono channel speaker. Also, the plurality of speakers 1320 may output a sound signal related to a function (for example, notification sound or a guide voice) that is performed in the air purifier 1000.

According to an embodiment of the disclosure, the plurality of speakers 1320 may be arranged along a circumference of an outer surface of the cylindrical filter portion 1200. In this case, the plurality of speakers 1320 may be arranged at regular intervals in such a way to be in contact with the cylindrical filter portion 1200 with largest contact areas. For example, when the plurality of speakers 1320 are three pieces, the plurality of speakers 1320 may be arranged at intervals of 120 degrees in such a way to be in close contact with the outer surface of the cylindrical filter portion 1200.

According to an embodiment of the disclosure, the output interface 1300 may further include a light (not shown). For example, the output interface 1300 may show a degree of indoor air pollution, air volume strength, etc. through the light (not shown). The light (not shown) may have various colors.

The output interface 1300 may output information related to replacement of at least one filter included in the filter portion 1200. For example, the output interface 1300 may output text, an image (for example, an icon), or a voice for guiding a current filter state or arrival of filter replacement time.

The processor 1400 may control overall operations of the air purifier 1000. For example, the processor 1400 may execute programs stored in the memory 1800 to control overall operations of the blow portion 1100, the filter portion 1200, the output interface 1300, the communication interface 1500, the sensing portion 1600, the user input interface 1700, the memory 1800, a power supply (not shown), etc.

According to an embodiment of the disclosure, the processor 1400 may include an artificial intelligence (AI) processor for generating an artificial intelligence model, although not limited thereto. According to an embodiment of the disclosure, the artificial intelligence processor may be implemented as a separate chip from the processor 1400. According to an embodiment of the disclosure, the artificial intelligence processor may be a universal chip.

According to an embodiment of the disclosure, the processor 1400 may control the plurality of speakers 1320 to output a sound signal corresponding to sound information, based on the sound information obtained from an external device (not shown).

According to an embodiment of the disclosure, when sound information obtained from an external device includes stereophonic information, the processor 1400 may control the plurality of speakers 1320 to output a stereophonic signal corresponding to the stereophonic information. An operation of outputting a stereophonic signal from the plurality of speakers 1320 will be described in detail with reference to FIG. 6, later.

According to an embodiment of the disclosure, the processor 1400 may control the plurality of speakers 1320 to output a stereophonic signal based on a user's location sensed through a human body sensor 1610. For example, when a user is located between the first speaker 1321 and the second speaker 1322, the processor 1400 may control the first speaker 1321 to output a left sound signal, the second speaker 1322 to output a right sound signal, and the third speaker 1323 which is opposite to the user to output a mono sound signal.

According to an embodiment of the disclosure, the processor 1400 may adjust an output intensity of each of the plurality of speakers 1320, based on a user's location sensed through the human body sensor 1610. For example, when the first speaker 1321 and the second speaker 1322 of the plurality of speakers 1320 are determined to be closest to a user, the processor 1400 may increase output intensities of the first speaker 1321 and the second speaker 1322, and reduce an output intensity of the third speaker 1323. An operation of adjusting output intensities of the plurality of speakers 1320 based on a user's location in the processor 1400 will be described in detail with reference to FIG. 10, later.

According to an embodiment of the disclosure, the processor 1400 may sense or determine a change of an air volume of the air purifier 1000 based on operation of the air purifier 100. The processor 1400 may determine a noise level changed according to a change of an air volume of the air purifier 1000, and adjust output intensities of the plurality of speakers 1320 based on the determined noise level. An operation of adjusting output intensities of the plurality of speakers 1320 in the processor 1400 will be described in detail with reference to FIG. 12, later.

According to an embodiment of the disclosure, the processor 1400 may determine a certain frequency band of which a noise level changes according to a change of an air volume of the air purifier 1000. At this time, the processor 1400 may adjust an output intensity of a signal corresponding to the certain frequency band from among sound signals output through the plurality of speakers 1320. An operation of adjusting an output intensity of a signal corresponding to a certain frequency band in the processor 1400 will be described in detail with reference to FIG. 14, later.

The interface 1500 or communication interface 1500 may include one or more components for enabling the air purifier 1000 to communicate with a server device (not shown) or a mobile terminal (not shown). For example, the communication interface 1500 may include a short-range communication interface 1510 and a broadcasting receiver 1520.

The short-range communication interface 1510 may include a Bluetooth communication interface, a Bluetooth Low Energy (BLE) communication interface, a Near-Field Communication (NFC) unit, a Wireless Local Access Network (WLAN: Wi-Fi) communication interface, a Zigbee communication interface, an Infrared Data Association (IrDA) communication interface, a Wi-Fi Direct (WFD) communication interface, a Ultra Wideband (UWB) communication module, and an Ant+ communication interface, although not limited thereto.

The broadcasting receiver 1520 may receive a broadcasting signal and/or broadcasting-related information from the outside through a broadcasting channel. The broadcasting channel may include a satellite channel and a terrestrial channel. According to implementation examples, the air purifier 1000 may not include the broadcasting receiver 1520.

The communication interface 1500 may obtain sound information from an external device (not shown). The communication interface 1500 may obtain sound information from an external device through wired or wireless communication. The external device (not shown) may include a server device, a mobile terminal, a wearable device (for example, a watch, a band, glasses, a mask, etc.), a home appliance (for example, a TV, a desktop PC, a laptop computer, a digital versatile disc (DVD) device, a washing machine, a refrigerator, etc.), etc., although not limited thereto. The sound information may include various audio files, such as a music file, a performance file, a musical file, an opera file, a fairy tale file, etc. The sound information may include stereophonic information implemented through a plurality of channels.

According to an embodiment of the disclosure, the communicator 1500 may obtain a user's location information from the user's mobile terminal (not shown). For example, the communicator 1500 may receive a user's location information (for example, GPS information) from the user's mobile terminal through short-range wireless communication (for example, Bluetooth, UWB, etc.). According to an embodiment of the disclosure, the communication interface 1500 may obtain a user's location information from a server device (not shown). At this time, the server device may be connected to the user's mobile terminal and the air purifier 1000 with a preset address. For example, when the user's mobile terminal uploads its location information on the server device, the communication interface 1500 may receive the location information of the mobile terminal from the server device.

The sensor 1600 or sensing portion 1600 may include the human body sensor 1610, a dust sensor 1620, a temperature sensor 1630, and a gas sensor 1640, although not limited thereto. For example, the sensing portion 1600 may further include a carbon dioxide sensor for measuring a density of carbon dioxide in air, an image sensor for sensing a user's location, a noise measuring sensor for measuring noise, a laser sensor for precisely sensing fine particles, etc.

The human body sensor 1610 may sense existence of a person around the air purifier 1000. For example, the human body sensor 1610 may sense a user's location. The human body sensor 1610 may be a sensor for sensing a change of infrared light generated when a person or animal moves. The human body sensor 1610 is also referred to as a pyroelectric infrared (PIR) sensor or a motion sensor. According to an embodiment of the disclosure, a plurality of human body sensors 1610 may be installed in the air purifier 1000.

According to an embodiment of the disclosure, when the air purifier 1000 further includes an image sensor (not shown), the air purifier 1000 may track a user's location through the image sensor.

The dust sensor 1620 may be a sensor for measuring a density of dust in air. The temperature sensor 1630 may be a sensor for measuring temperature of air. The gas sensor 1640 may be a sensor for measuring a density of gas in air. Functions of the sensors may be intuitively inferred by one of ordinary skill in the art from their names, and therefore, detailed descriptions thereof will be omitted.

The user input interface 1700 may be a device for enabling a user to input data for controlling the air purifier 1000. For example, the user input interface 1700 may be a key pad, a dome switch, a touch pad (a capacitive type, a resistive type, an infrared beam type, a surface acoustic wave type, an integral strain gauge type, a piezo effect type, etc.), a jog wheel, a jog switch, etc., although not limited thereto.

According to an embodiment of the disclosure, the user input interface 1700 may include a button portion including a power button, an air volume control button, a FM frequency control button, a reservation setting button, a mode switching button, a volume control button, a sleeping button, an automatic sterilization button, a lighting button, etc.

The user input interface 1700 may further include a microphone (not shown) for receiving a user's voice input. The microphone may receive an external sound signal and process the external sound signal into electrical sound data. For example, the microphone may receive a sound signal (for example, a voice command) from an external device or a speaker. The microphone may use various noise removal algorithms for removing noise generated when receiving an external sound signal.

The memory 1800 may store a program for processing and control by the processor 1300, and store input/output data (for example, a fine dust level, temperature/humidity data, a gas level, a notification setting, filter replacement information, etc.).

The memory 1800 may include at least one type of storage medium of a flash memory type, a hard disk type, a multimedia card micro type, card type memory (for example, secure digital (SD) memory or extreme digital (XD) memory), random access memory (RAM), static random access memory (SRAM), read-only memory (ROM), electrically erasable programmable read-only memory (EEPROM), programmable read-only memory (PROM), magnetic memory, a magnetic disk, or an optical disk. Programs stored in the memory 1800 may be classified into a plurality of modules according to their functions.

The air purifier 1000 may further include a power supply (not shown). The power supply (not shown) may supply power to the components of the air purifier 1000 according to a control by the processor 1400. The power supply (not shown) may supply power received from an external power source through a power code to the individual components of the air purifier 1000 according to a control by the processor 1400.

Hereinafter, a method of providing a high sound quality stereophonic service by using the plurality of speakers 1320 in the air purifier 1000 will be described in more detail.

Figure 6:
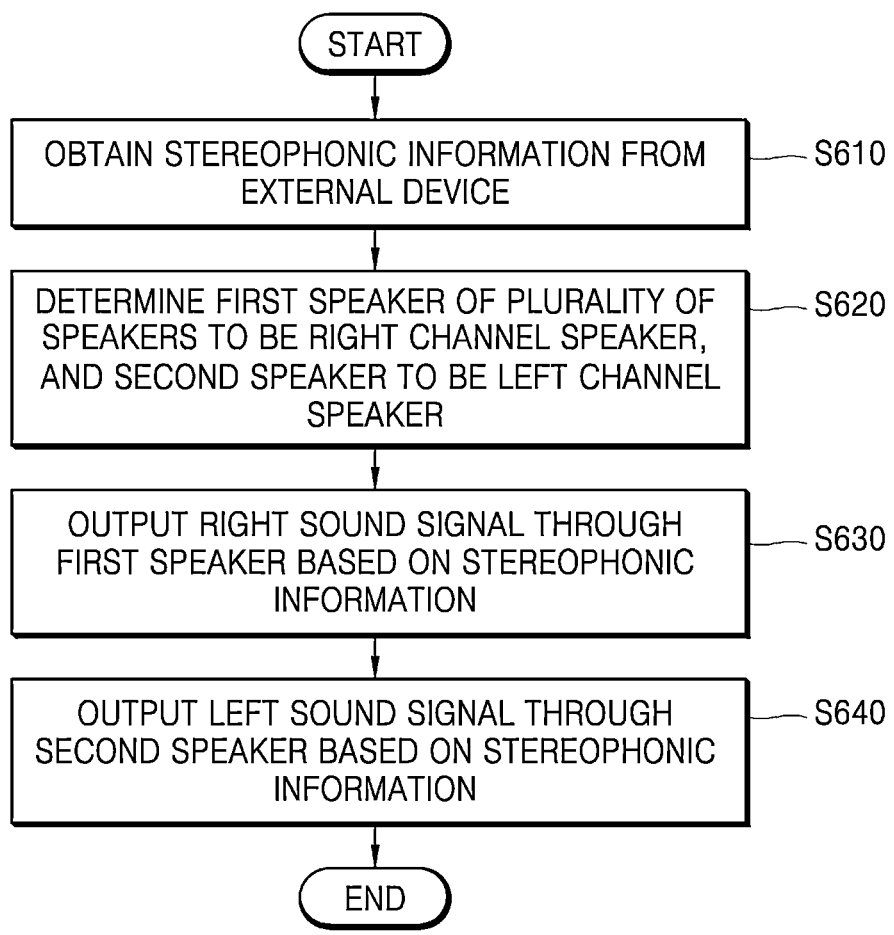
FIG. 6 is a flowchart illustrating a method of outputting a stereophonic signal in an air purifier, according to an aspect of the disclosure.

FIG. 6 is a flowchart illustrating a method of outputting a stereophonic signal in an air purifier, according to an aspect of the disclosure.

In operation S610, the air purifier 1000 according to an embodiment of the disclosure may obtain stereophonic information from an external device. The stereophonic information may include a right sound signal, a left sound signal, etc., although not limited thereto. The stereophonic information may include sound signals of a mid-bandwidth and a high-bandwidth and sound signals of a low-bandwidth. According to an embodiment of the disclosure, the external device may be a peripheral device located within a preset distance from the air purifier 1000. For example, the external device may be a TV, a PC, a mobile terminal, a wearable device, a video phone, etc. According to an embodiment of the disclosure, the external device may be a server device.

According to an embodiment of the disclosure, when a user selects music which he/she wants to hear on a mobile terminal, the air purifier 1000 may obtain stereophonic information corresponding to the music selected by the user from the mobile terminal. At this time, the air purifier 1000 may receive the stereophonic information directly from the mobile terminal through short-range wireless communication, or may receive the stereophonic information from a server device that provides a service related to the music selected by the user.

In operation S620, the air purifier 1000 according to an embodiment of the disclosure may determine the first speaker 1321 of the plurality of speakers 1320 to be a right channel speaker (or a left channel speaker), and the second speaker 1322 to be a left channel speaker (or a right channel speaker). The plurality of speakers 1320 according to an embodiment of the disclosure may be arranged along the circumference of the outer surface of the cylindrical filter 1200 located inside the air purifier 1000. Also, the plurality of speakers 1320 may be arranged in such a way to be in contact with the cylindrical filter portion 1200 with largest contact areas.

According to an embodiment of the disclosure, the air purifier 1000 may determine the first speaker 1321 of the plurality of speakers 1320 to be a right channel speaker, and the second speaker 1322 to be a left channel speaker, based on initial setting information. The initial setting information may change by a user. For example, the user may designate the first speaker 1321 of the plurality of speakers 1320 as a left channel speaker and the second speaker 1322 as a right channel speaker.

According to an embodiment of the disclosure, the air purifier 1000 may determine the first speaker 1321 of the plurality of speakers 1320 to be a right channel speaker (or a left channel speaker), and the second speaker 1322 to be a left channel speaker (or a right channel speaker), based on a user's location. For example, the air purifier 1000 may determine two speakers located close to a user's location sensed through the human body sensor 1610 from among the plurality of speakers 1320, and select one of the two speakers as a right channel speaker and the other one as a left channel speaker. For example, when the air purifier 1000 includes the first speaker 1321, the second speaker 1322, and the third speaker 1323, and a user's location sensed by the human body sensor 1610 is between the first speaker 1321 and the second speaker 1322, the air purifier 1000 may select the first speaker 1321 as a right channel speaker and the second speaker 1322 as a left channel speaker.

According to an embodiment of the disclosure, when a user returns home after going out, the air purifier 1000 may determine a right channel speaker and a left channel speaker from among the plurality of speakers 1320, based on the user's location, to play preset music. The preset music may be music set in advance by the user to listen to the music home.

According to an embodiment of the disclosure, when the user moves around the air purifier 1000, the right channel speaker and the left channel speaker may change. For example, when the user is located between the first speaker 1321 and the second speaker 1322, the air purifier 1000 may select the first speaker 1321 as a right channel speaker (or a left channel speaker) and the second speaker 1322 as a left channel speaker (or a right channel speaker). At this time, when the user moves to be located between the second speaker 1322 and the third speaker 1323, the air purifier 1000 may select the second speaker 1322 as a right channel speaker (a left channel speaker) and the third speaker 1323 as a left channel speaker (or a right channel speaker).

According to an embodiment of the disclosure, when the plurality of speakers 1320 include three speakers or more, the air purifier 1000 may determine, as a mono channel speaker, the remaining speaker except for speakers determined to be a right channel speaker and a left channel speaker among the plurality of speakers 1320, based on a user's location sensed through the human body sensor 1610. For example, when the first speaker 1321 is determined to be a right channel speaker and the second speaker 1322 is determined to be a left channel speaker, the air purifier 1000 may determine the third speaker 1323 to be a mono channel speaker. This will be described in more detail with reference to FIGS. 7 to 9.

Figure 7:
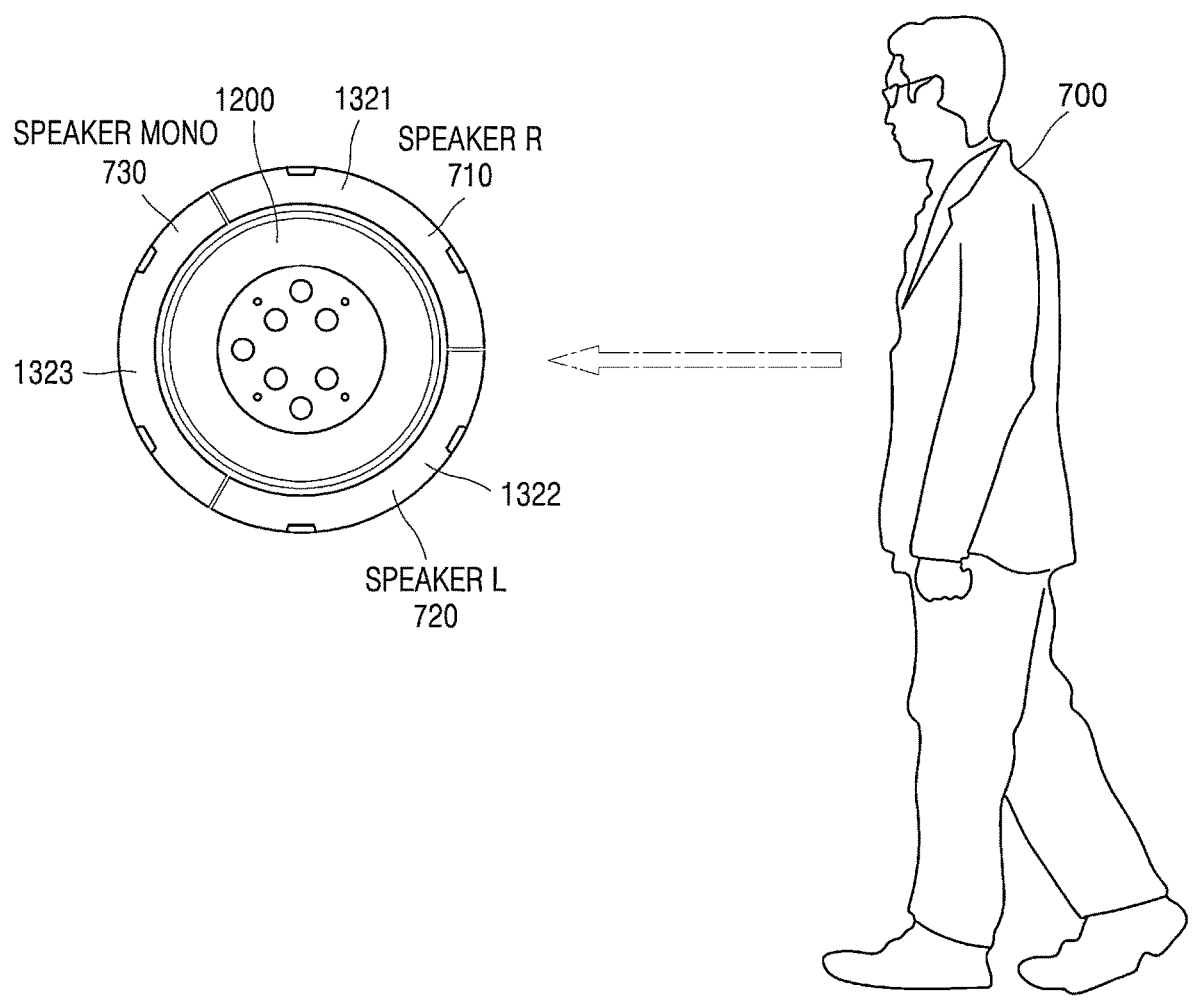
FIG. 7 is a view illustrating an operation of outputting a stereophonic signal based on a user's location, in an air purifier including three speakers, according to an aspect of the disclosure.

Referring to FIG. 7, the air purifier 1000 may include the first speaker 1321, the second speaker 1322, and the third speaker 1323. According to an embodiment of the disclosure, the air purifier 1000 may determine that a user 700 is located between the first speaker 1321 and the second speaker 1322, based on location information of the user 700, sensed through the human body sensor 1610. In this case, the air purifier 1000 may determine the first speaker 1321 and the second speaker 1322 positioned close to the user 700 to be a right channel speaker 710 and a left channel speaker 720, and determine the third speaker 1323 that is opposite to the user 700 to be a mono channel speaker 730.

Figure 8:
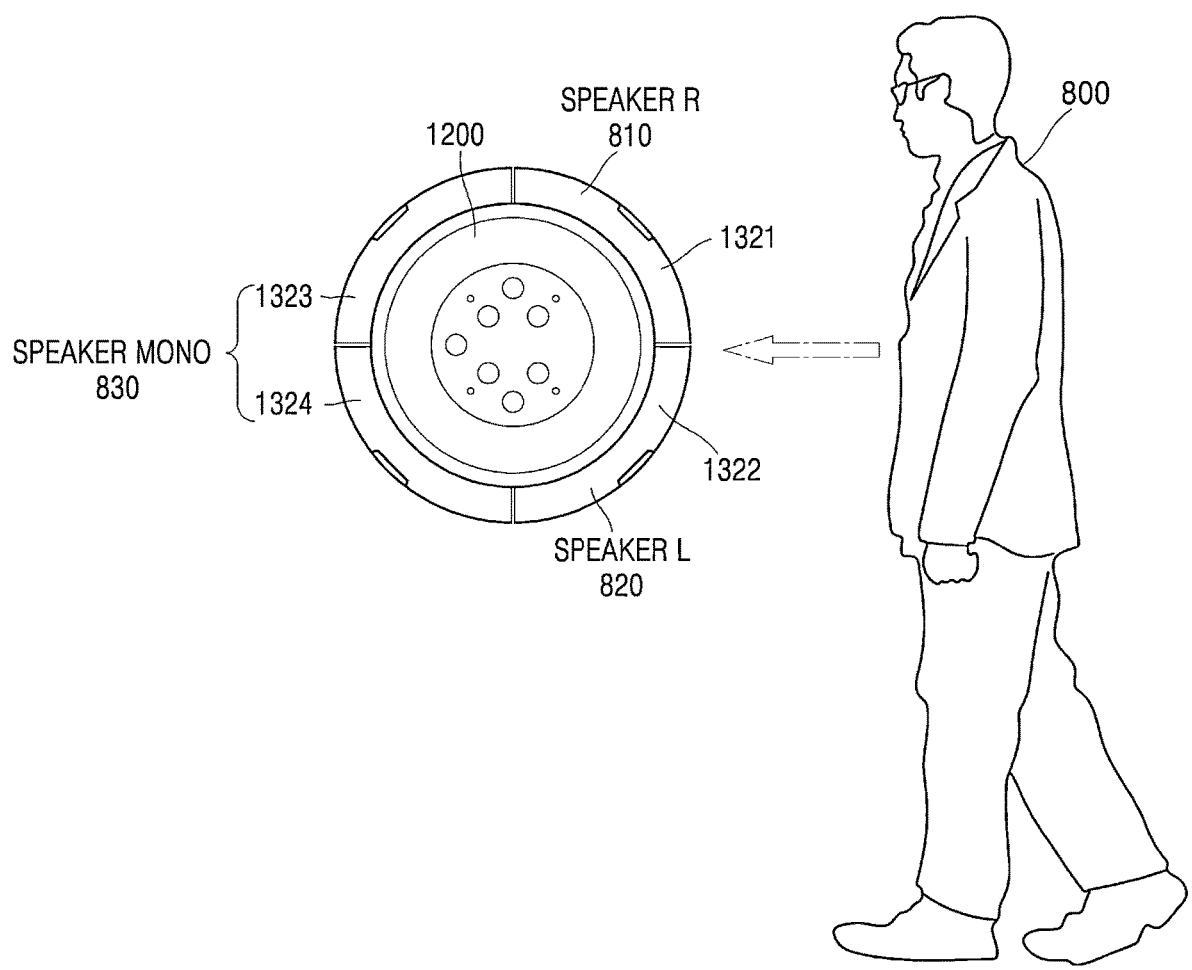
FIG. 8 is a view illustrating an operation of outputting a stereophonic signal based on a user's location, in an air purifier including four speakers, according to an aspect of the disclosure.

Referring to FIG. 8, the air purifier 1000 may include the first speaker 1321, the second speaker 1322, the third speaker 1323, and the fourth speaker 1324. According to an embodiment of the disclosure, the air purifier 1000 may determine that a user 800 is located between the first speaker 1321 and the second speaker 1322, based on location information of the user 800, sensed through the human body sensor 1610. In this case, the air purifier 1000 may determine the first speaker 1321 to be a right channel speaker 810, the second speaker 1322 to be a left channel speaker 820, and the third speaker 1323 and the fourth speaker 1324 that are opposite to the user 800 to be mono channel speakers 830.

Figure 9:
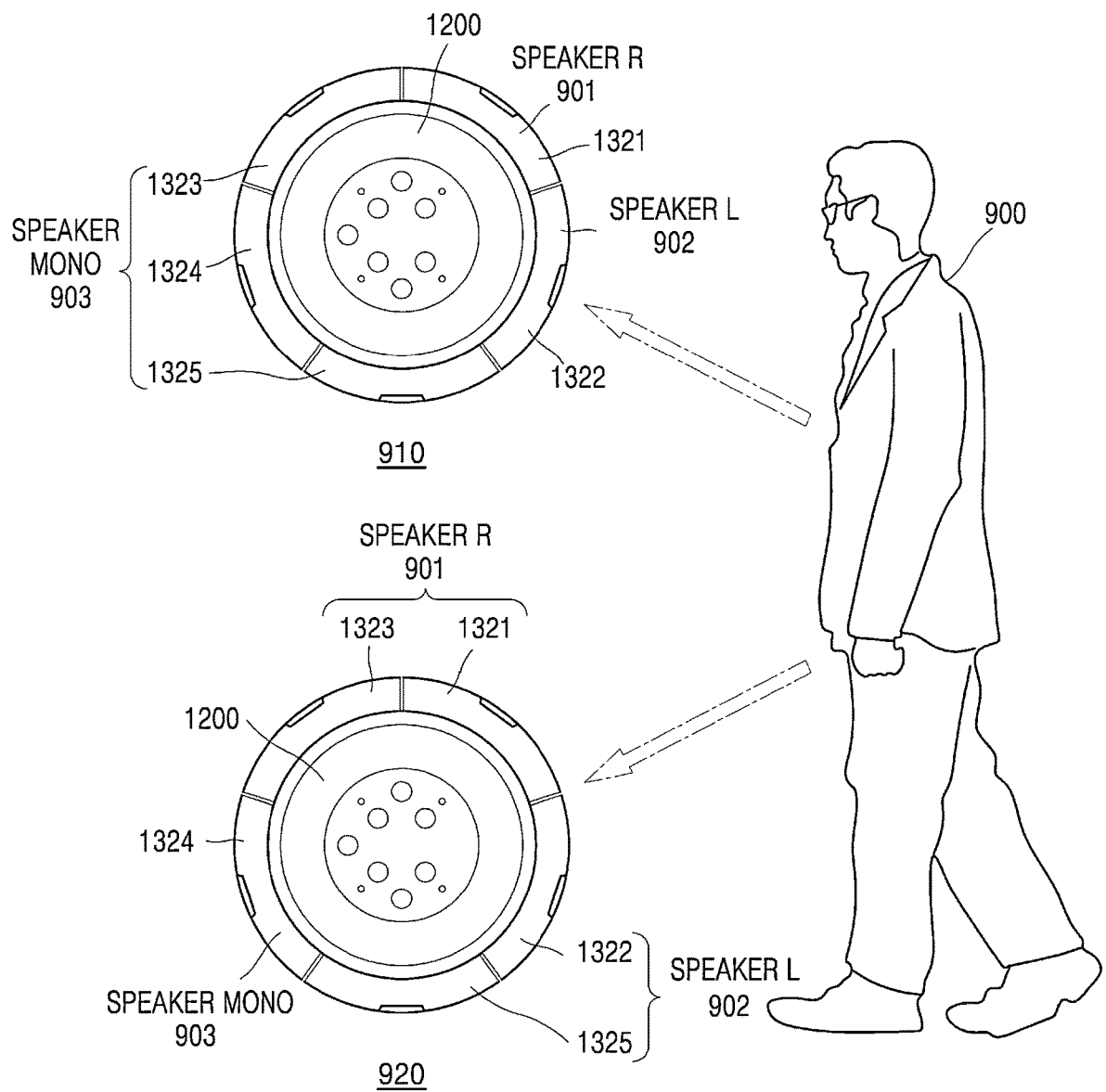
FIG. 9 is a view illustrating an operation of outputting a stereophonic signal based on a user's location, in an air purifier including five speakers, according to an aspect of the disclosure.

Referring to FIG. 9, the air purifier 1000 may include the first speaker 1321, the second speaker 1322, the third speaker 1323, the fourth speaker 1324, and the fifth speaker 1325. According to an embodiment of the disclosure, the air purifier 1000 may determine that a user 900 is located between the first speaker 1321 and the second speaker 1322, based on location information of the user 900, sensed through the human body sensor 1610. In this case, referring to arrangement 910 of FIG. 9, the air purifier 1000 may determine the first speaker 1321 to be a right channel speaker 901, the second speaker 1322 to be a left channel speaker 902, and the third speaker 1323, the fourth speaker 1324, and the fifth speaker 1325 that are opposite to the user 900 to be mono channel speakers 903. Referring to arrangement 920 of FIG. 9, the air purifier 1000 may determine the first speaker 1321 and the third speaker 1323 to be right channel speakers 901, the second speaker 1322 and the fifth speaker 1325 to be left channel speakers 902, and the fourth speaker 1324 that is opposite to the user 800 to be a mono channel speaker 903.

Returning again to FIG. 6, in operation S603, the air purifier 1000 according to an embodiment of the disclosure may output a right sound signal through the first speaker 1321 determined to be a right channel speaker, based on stereophonic information.

In operation S640, the air purifier 1000 according to an embodiment of the disclosure may output a left sound signal through the second speaker 1322 determined to be a left channel speaker, based on the stereophonic information.

According to an embodiment of the disclosure, when the air purifier 1000 includes the woofer speaker 1330, the air purifier 1000 may output a low-bandwidth sound signal through the woofer speaker 1330, thereby providing the user with a rich stereophonic service.

Hereinafter, an operation of adjusting output intensities of the plurality of speakers 1320 in the air purifier 1000 will be described in detail with reference to FIGS. 10 to 12.

Figure 10:
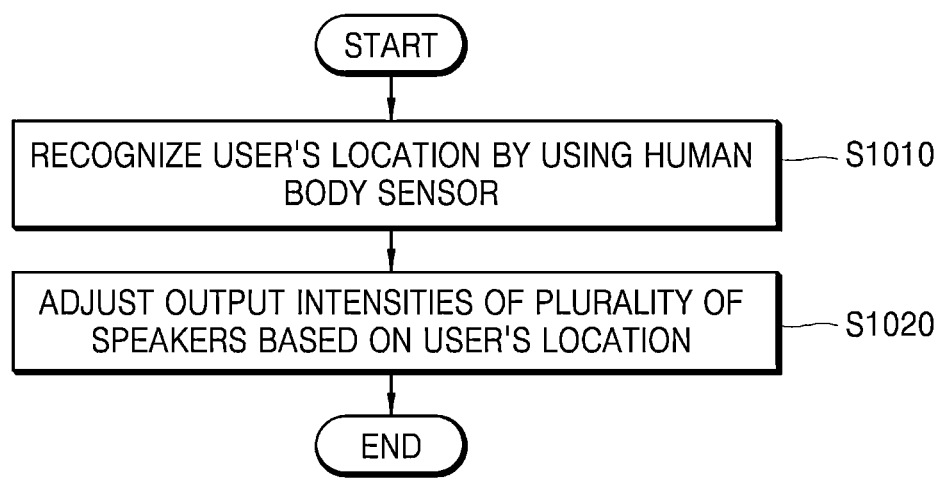
FIG. 10 is a flowchart illustrating a method of adjusting output intensities of a plurality of speakers based on a user's location, in an air purifier, according to an aspect of the disclosure.

FIG. 10 is a flowchart illustrating a method of adjusting output intensities of a plurality of speakers based on a user's location, in an air purifier, according to an aspect of the disclosure.

In operation S1010, the air purifier 1000 according to an embodiment of the disclosure may recognize a user's location by using the human body sensor 1610. For example, the human body sensor 1610 may track a direction in which a user's operation is sensed, and recognize which one of the plurality of speakers 1320 the user is close to. Also, the human body sensor 1610 may count the number of persons existing within a preset range. For example, the human body sensor 1610 may sense the number of persons existing around the air purifier 1000.

According to an embodiment of the disclosure, a plurality of human body sensors 1610 may be provided. In this case, the air purifier 1000 may more accurately track a user's location.

In operation S1020, the air purifier 1000 according to an embodiment of the disclosure may adjust output intensities of the plurality of speakers 1320 based on the user's location. According to an embodiment of the disclosure, the air purifier 1000 may increase an output intensity of a speaker located close to the user's location, and reduce an output intensity of a speaker located far away from the user's location. For example, the air purifier 1000 may determine the first speaker 1321 and the second speaker 1322 among the plurality of speakers 1320 to be speakers located closest to the user, based on the user's location. In this case, the air purifier 1000 may increase output intensities of the first speaker 1321 and the second speaker 1322. Also, the air purifier 1000 may reduce an output intensity of the remaining speaker (for example, the third speaker 1323) except for the first speaker 1321 and the second speaker 1322.

According to an embodiment of the disclosure, when a right channel speaker, a left channel speaker, and a mono channel speaker are determined based on a user's location, the air purifier 1000 may increase output intensities of speakers determined to be the right channel speaker and the left channel speaker, and reduce an output intensity of a speaker determined to be the mono channel speaker. In this case, volumes of right channel sound and left channel sound may be louder than a volume of mono channel sound which is background sound, and accordingly, the air purifier 1000 may provide a high sound quality stereophonic service to the user. Referring to FIG. 11, an operation of adjusting output intensities of the plurality of speakers 1320 based on a user's location in the air purifier 1000 will be described in more detail.

Figure 11:
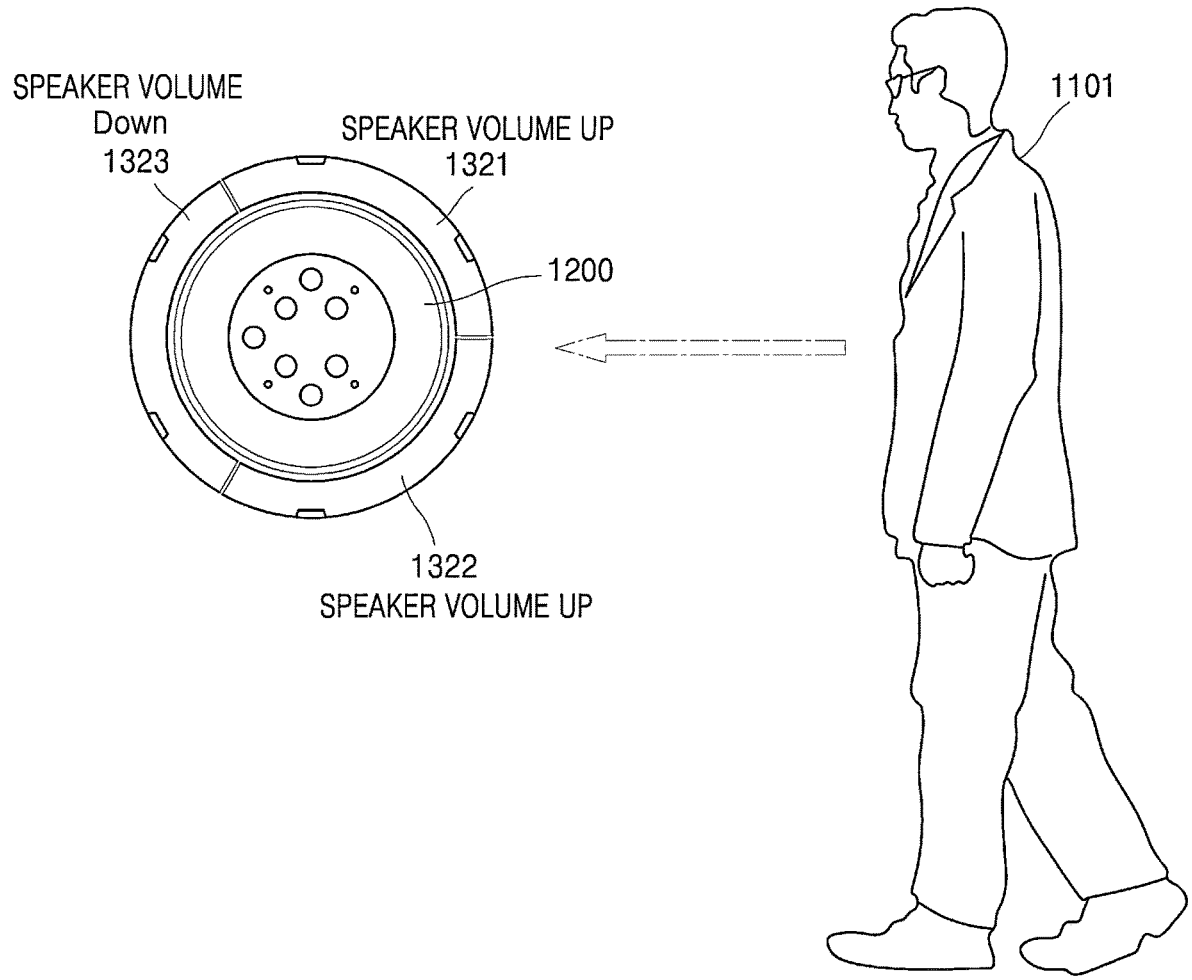
FIG. 11 is a view illustrating an operation of adjusting output intensities of a plurality of speakers based on a user's location, in an air purifier, according to an aspect of the disclosure.

FIG. 11 is a view illustrating an operation of adjusting output intensities of a plurality of speakers based on a user's location, in an air purifier, according to an aspect of the disclosure.

Referring to FIG. 11, the air purifier 1000 may include the first speaker 1321, the second speaker 1322, and the third speaker 1323. According to an embodiment of the disclosure, the air purifier 1000 may determine that a user 1101 is located between the first speaker 1321 and the second speaker 1322, based on location information of the user 1101 sensed through the human body sensor 1610. In this case, the air purifier 1000 may increase output intensities of the first speaker 1321 and the second speaker 1322 located relatively close to the user 1101, and reduce an output intensity of the third speaker 1323 located relatively far away from the user 1101. According to an embodiment of the disclosure, the first speaker 1321 and the second speaker 1322 may be a right channel speaker and a left channel speaker, and the third speaker 1323 may be a mono channel speaker.

According to an embodiment of the disclosure, when the location of the user 1101 changes, the output intensities of the plurality of speakers 1320 may also change. For example, when the user 1101 is located between the first speaker 1321 and the second speaker 1322, the air purifier 1000 may set volumes of the first speaker 1321 and the second speaker 1322 to a level 5, and a volume of the third speaker 1323 to a level 2. At this time, the user 1101 may move to be located between the second speaker 1322 and the third speaker 1323. In this case, the air purifier 1000 may set volumes of the second speaker 1322 and the third speaker 1323 to the level 5, and the volume of the first speaker 1321 to the level 2.

Figure 12:
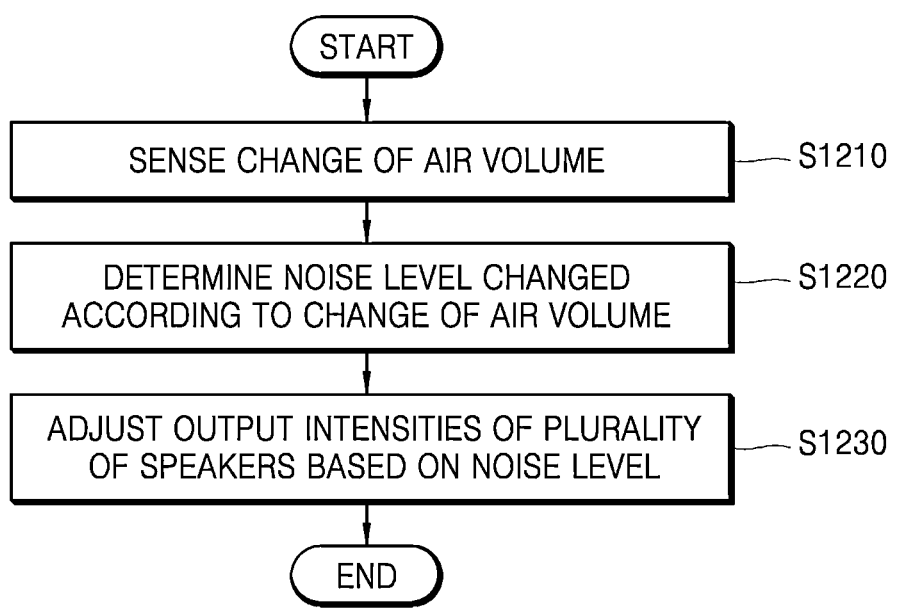
FIG. 12 is a flowchart illustrating a method of adjusting output intensities of a plurality of speakers based on a change of an air volume in an air purifier, according to an aspect of the disclosure.

FIG. 12 is a flowchart illustrating a method of adjusting output intensities of a plurality of speakers based on a change of an air volume in an air purifier, according to an aspect of the disclosure.

In operation S1210, the air purifier 1000 according to an embodiment of the disclosure may sense or determine a change of an air volume.

According to an embodiment of the disclosure, when a user adjusts an air volume manually, the air purifier 1000 may sense or determine a change of an air volume. For example, when the user raises an air volume from a level 'weak' to a level 'strong', the air purifier 1000 may sense or determine a change of the air volume based on the user's input.

According to an embodiment of the disclosure, the air purifier 1000 may adjust an air volume automatically based on a degree of air pollution. For example, when a degree of air pollution based on a value measured by the dust sensor 1620 or the gas sensor 1640 is higher than or equal to a preset value, the air purifier 1000 may raise a level of an air volume.

In operation S1220, the air purifier 1000 according to an embodiment of the disclosure may determine a noise level changed according to the change of the air volume. For example, when an air volume is raised from 'weak' to 'strong', a noise level may increase by 20 dB. In this case, the air purifier 1000 may determine a noise level changed according to the change of the air volume to be 20 dB.

According to an embodiment of the disclosure, the air purifier 1000 may determine a noise level changed according to the change of the air volume, based on information stored in advance in the memory 1800. According to an embodiment of the disclosure, information about noise levels that change according to changes of air volumes may have been stored in advance in the air purifier 1000. For example, information about noise levels that change according to changes of air volumes may have been stored in advance in the memory 1800 of the air purifier 1000 based on pre-measured experimental values. For example, information, such as an increase of a noise level by 10 dB when an air volume changes from a level 'weak' to a level 'medium' and an increase of a noise level by 15 dB when an air volume changes from the level 'medium' to a level 'strong', may have been stored in advance in the memory 1800 of the air purifier 1000. Alternatively, information indicating a noise level of 5 dB when an air volume is in the level 'weak', a noise level of 15 dB when an air volume is in the level 'medium', and a noise level of 30 dB when an air volume is in the level 'strong' may have been stored in the memory 1800.

According to an embodiment of the disclosure, the air purifier 1000 may include a noise measuring sensor. In this case, when a change of an air volume is sensed, the air purifier 1000 may measure a changed noise level by using the noise measuring sensor. For example, a case in which an air volume changes from the level 'weak' to the level 'medium' is assumed. In the case in which a noise level measured by the noise measuring sensor when an air volume is in the level 'weak' is 5 dB and a noise level measured by the noise measuring sensor when an air volume is in the level 'medium' is 17 dB, the air purifier 1000 may determine a noise level changed according to a change of the air volume to be 12 dB.

In operation S1230, the air purifier 1000 according to an embodiment of the disclosure may adjust output intensities of the plurality of speakers 1320 based on the noise level changed according to the change of the air volume.

For example, when a noise level increases by 10 dB according to a change of an air volume, the air purifier 1000 may increase an output intensity of each of the plurality of speakers 1320 by 10 dB. In this case, although noise generated by the air purifier 1000 increases according to a change of an air volume, a user may stably hear sound output from the plurality of speakers 1320.

Figure 13:
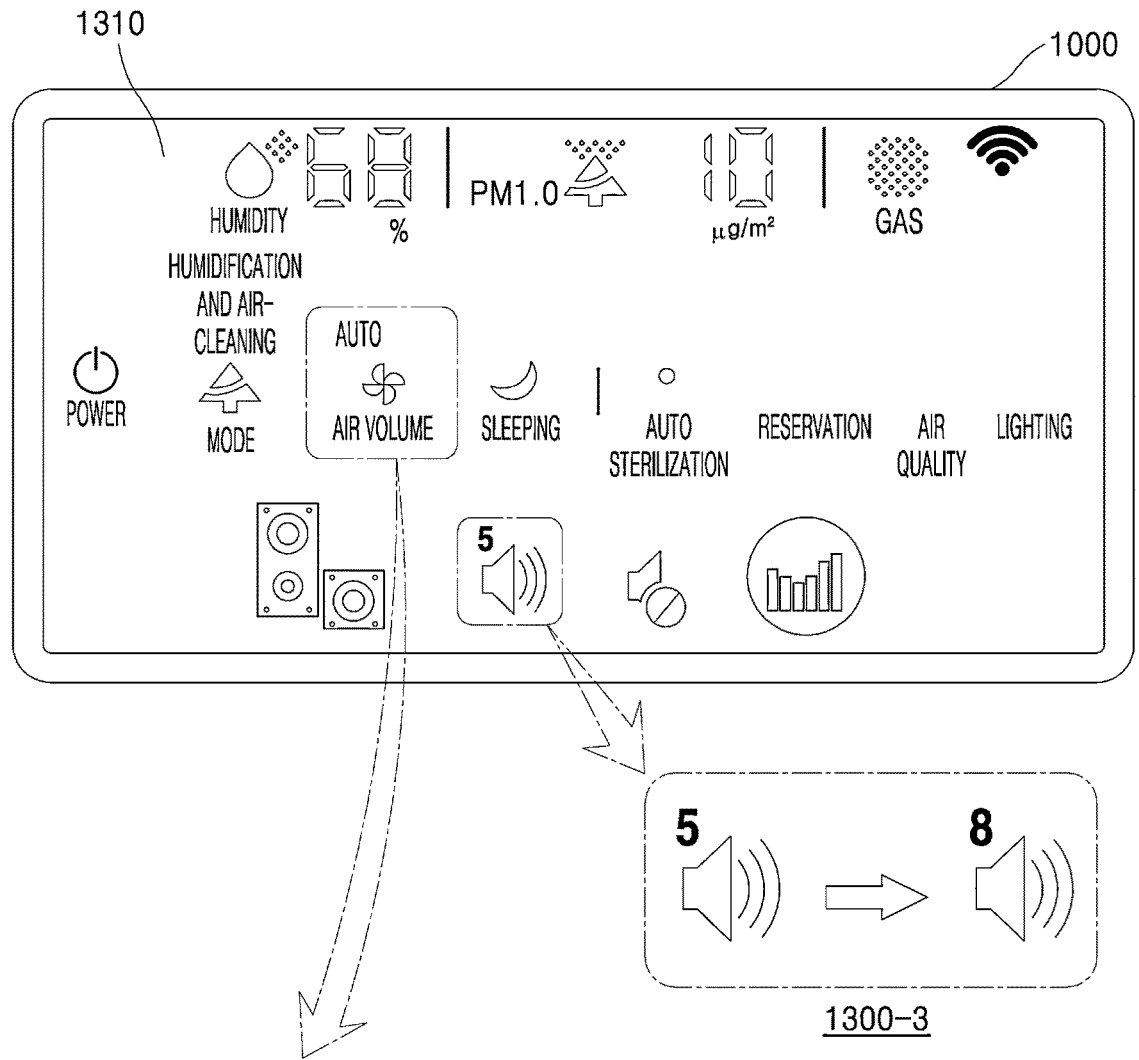
FIG. 13 is a view illustrating an operation of adjusting output intensities of a plurality of speakers according to a change of an air volume in an air purifier, according to an aspect of the disclosure.

FIG. 13 is a view illustrating an operation of adjusting output intensities of a plurality of speakers according to a change of an air volume in an air purifier, according to an aspect of the disclosure.

Referring to view 1300-1 of FIG. 13, when a degree of air pollution increases, the air purifier 1000 may automatically increase an air volume. For example, when a degree of air pollution changes from 'good' to 'very bad', the air purifier 1000 may change an air volume from the level 'weak' to the level 'strong'. At this time, the air purifier 1000 may sense the change (from 'weak' to 'strong') of the air volume, and determine a noise level changed according to the change of the air volume. For example, in the case in which a noise level when an air volume is in the level 'weak' is 10 dB and a noise level when an air volume is in the level 'strong' is 30 dB, the air purifier 1000 may determine a noise level changed according to a change of the air volume to be 20 dB.

The air purifier 1000 may adjust output intensities of the plurality of speakers 1320, based on the noise level (for example, 20 dB) changed according to the change of the air volume. For example, referring to view 1300-2 of FIG. 13, the air purifier 1000 may include the first speaker 1321, the second speaker 1322, and the third speaker 1323. Because the noise level changed according to the change of the air volume is 20 dB, the air purifier 1000 may increase an output intensity of each of the first speaker 1321, the second speaker 1322, and the third speaker 1323 by 20 dB.

In this case, because a volume of sound output from the plurality of speakers 1320 increases although noise of the air purifier 100 increases according to the increase of the air volume, the air purifier 100 may provide a stable sound service to the user.

Referring to view 1300-3 of FIG. 13, when the output intensities of the plurality of speakers 1320 change, a graphic user interface (GUI) on the display 1310 positioned on the outer surface of the air purifier 1000 may change. For example, a speaker volume display may change from a level 5 to a level 8.

Figure 14:
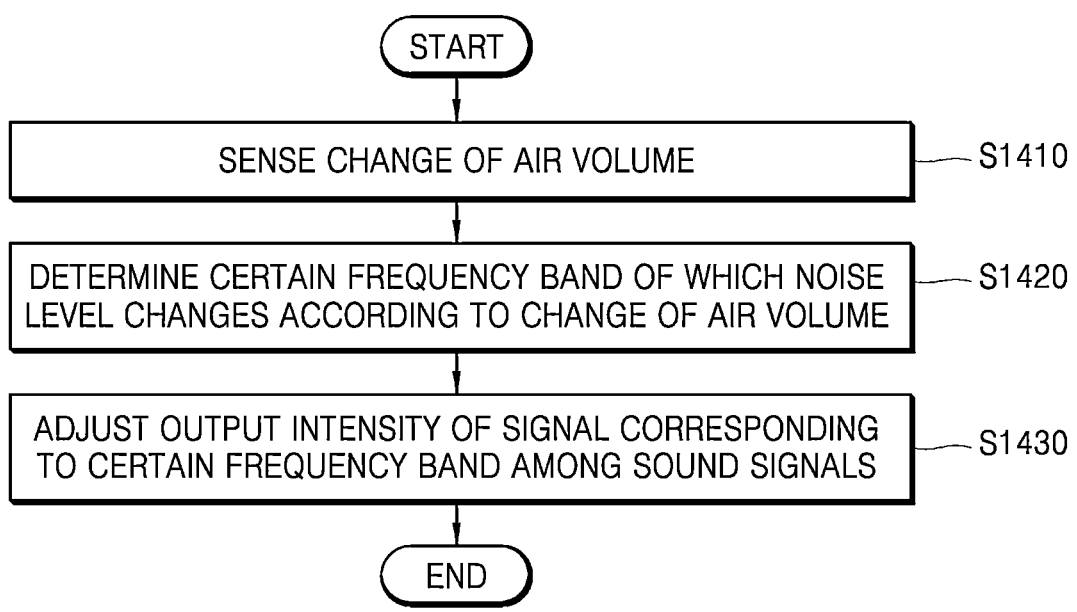
FIG. 14 is a flowchart illustrating a method of adjusting an output intensity of a signal corresponding to a certain frequency band based on a change of an air volume in an air purifier, according to an aspect of the disclosure.

FIG. 14 is a flowchart illustrating a method of adjusting an output intensity of a signal corresponding to a certain frequency band based on a change of an air volume in an air purifier, according to an aspect of the disclosure.

In operation S1410, the air purifier 1000 according to an embodiment of the disclosure may sense or determine a change of an air volume.

According to an embodiment of the disclosure, when a user adjusts an air volume manually, the air purifier 1000 may sense a change of the air volume. For example, when a user raises an air volume from the level 'weak' to the level 'strong', the air purifier 1000 may sense a change of the air volume according to the user's input.

According to an embodiment of the disclosure, the air purifier 1000 may adjust an air volume automatically based on a degree of air pollution. For example, when a degree of air pollution based on a value measured by the dust sensor 1620 or the gas sensor 1640 is greater than or equal to a preset value, the air purifier 1000 may increase an air volume.

In operation S1420, the air purifier 1000 according to an embodiment of the disclosure may determine a certain frequency band of which a noise level changes according to the change of the air volume.

For example, when the air volume changes from the level 'weak' to the level 'strong', a noise level of a certain frequency band (for example, 3 kHz to 7 kHz) among noise signals generated by the motor 1130 of the air purifier 1000 may increase. In this case, the air purifier 1000 may determine the certain frequency band of which the noise level changes according to the change of the air volume to be a band of '3 kHz to 7 kHz'.

In operation S1430, the air purifier 1000 according to an embodiment of the disclosure may adjust an output intensity of a signal corresponding to the certain frequency band among sound signals.

According to an embodiment of the disclosure, the air purifier 1000 may amplify or attenuate the signal of the certain frequency band, which is called parametric equalizer (PEQ) tuning. For example, when the certain frequency band of which the noise level changes according to the change of the air volume is determined to be '3 kHz to 7 kHz', the air purifier 1000 may change an equalizer (EQ) value of the certain frequency band (that is, 3 kHz to 5 kHz). At this time, the EQ value of the certain frequency band may increase when the air volume changes from the level 'weak' to the level 'strong', and decrease when the air volume changes from the level 'strong' to the level 'weak'. For example, when the air volume changes from the level 'weak' to the level 'strong', the air purifier 1000 may increase an output intensity of the certain frequency band (that is, for example, 3 kHz to 7 kHz) by 10 dB.

Figure 15:
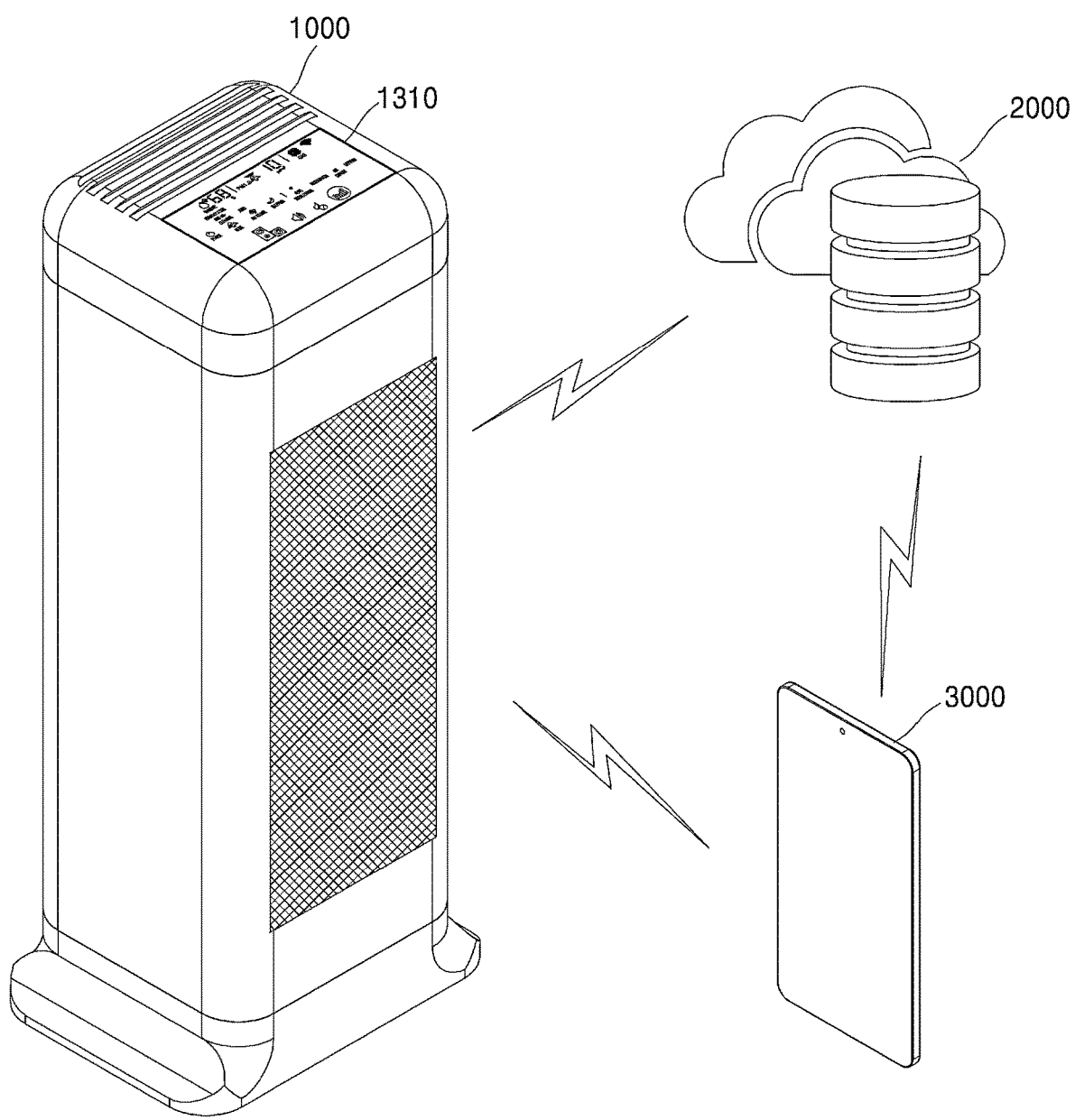
FIG. 15 is a view illustrating an operation in which an air purifier according to an aspect of the disclosure cooperates or interworks with a server device or a mobile terminal.

FIG. 15 is a view illustrating an operation in which an air purifier according to an aspect of the disclosure cooperates or interworks with a server device or a mobile terminal.

According to an embodiment of the disclosure, the air purifier 1000 may include a communication interface 1500 for communicating with an external device. According to an embodiment of the disclosure, the air purifier 1000 may communicate with a server device 2000 or a mobile terminal 3000 through the communication interface 1500. The communication interface 1500 may include a short-range wireless communication interface, a mobile communication interface, etc. The short-range wireless communication interface may include a Bluetooth communication interface, a Bluetooth Low Energy (BLE) communication interface, a Near-Field Communication (NFC) interface, a Wireless Local Access Network (WLAN: Wi-Fi) communication interface, a Zigbee communication interface, an Infrared Data Association (IrDA) communication interface, a Wi-Fi Direct (WFD) communication interface, a Ultra Wideband (UWB) communication interface, and an Ant+ communication interface, although not limited thereto.

According to an embodiment of the disclosure, the air purifier 1000 may sense a touch input from a user. In the entire specification, "touch input" means a gesture, etc. made on a touch screen by a user to control the air purifier 1000. For example, a touch input described in the present specification may be tap, touch & hold, double tap, drag, pinch, drag & drop, etc.

According to an embodiment of the disclosure, the air purifier 1000 may include an artificial intelligence (AI) model for tracking a user's location and controlling the plurality of speakers 1320 based on the user's location. According to an embodiment of the disclosure, the air purifier 1000 may directly generate or refine the artificial intelligence model by using training data. Also, the air purifier 1000 may receive an artificial intelligence model trained in the server device 2000 from the server device 2000, and store the artificial intelligence model.

According to an embodiment of the disclosure, the server device 2000 may include an artificial intelligence processor. The artificial intelligence processor may train an artificial neural network to track a movement location of an object and generate an artificial intelligence model for recognizing a new object. 'Training' an artificial neural network may mean generating a mathematical model that causes connections of neurons constituting the artificial neural network to make optimal decisions by appropriately changing weights based on data.

According to an embodiment of the disclosure, the server device 2000 may include a communication interface for communicating with an external device. According to an embodiment of the disclosure, the server device 2000 may communicate with the air purifier 1000 or the mobile terminal 3000 through a communication interface. According to an embodiment of the disclosure, the air purifier 1000 may access the server device 2000 by transmitting identification information of the air purifier 1000 or identification information (login information) of a user to the server device 2000, and receiving a certification of the identification information of the air purifier 1000 or the identification information (login information) of the user from the server device 2000.

The mobile terminal 3000 may be a device connected to the air purifier 1000 with the same address information as the air purifier 1000. The mobile terminal 3000 may be directly connected to the air purifier 1000 through a short-range communication link, or indirectly connected to the air purifier 1000 via the server device 2000.

The mobile terminal 3000 according to an embodiment of the disclosure may be implemented as various types. For example, the mobile terminal 3000 described in the present specification may be a digital camera, a smart phone, a laptop computer, a tablet PC, an e-book terminal, a digital broadcasting terminal, a personal digital assistant (PDA), a portable multimedia player (PMP), a navigation, a MP3 player, etc., although not limited thereto. For example, the mobile terminal 3000 may be a wearable device that a user may wear. The wearable device may include at least one of an accessory type device (e.g., a watch, a ring, a bracelet, an ankle bracelet, a necklace, glasses, contact lenses, a head-mounted-device (HMD)), a device combined with fabric or clothes (e.g., electronic clothes), a body attaching type device (e.g., a skin pad), or a body implantable type (e.g., an implantable circuit). Hereinafter, for convenience of description, a case in which the mobile terminal 3000 is a smart phone will be described as an example.

According to an embodiment of the disclosure, the air purifier 1000 or the mobile terminal 3000 may receive a voice signal which is an analog signal through a microphone, and convert a voice part into computer-readable text by using an automatic speech recognition (ASR) model. The air purifier 1000 or the mobile terminal 3000 may interpret the converted text by using a natural language understanding (NLU) model to obtain a user's utterance intention. Herein, the ASR model or the NLU model may be an artificial intelligence model. The artificial intelligence model may be processed by an artificial intelligence dedicated processor designed with a hardware structure specialized for processing an artificial intelligence model. The artificial intelligence model may be generated through training. Generating the artificial intelligence model through training means generating a predefined operation rule or artificial intelligent model set to perform a desired characteristic (or a purpose) by training a basic artificial intelligence model with a plurality of pieces of training data by a learning algorithm. The artificial intelligence model may be configured with a plurality of neural network layers. Each of the plurality of neural network layers may have a plurality of weight values, and perform neural network computation through computation between a computing result of the previous layer and the plurality of weights.

The linguistic comprehension is technology for recognizing and applying/processing human language/characters, and includes natural language processing, machine translation, a dialogue system, question answering, speech recognition/synthesis, etc.

Artificial intelligence-related functions according to the disclosure may operate through a processor and a memory. The processor may be configured with a single or plurality of processors. The single processor or each of the plurality of processors may be a general-purpose processor (for example, a central processing unit (CPU), an application processor (AP), and a digital signal processor (DSP)), a graphics-dedicated processor (for example, a graphics processing unit (GPU) and a vision processing unit (VPU)), or an artificial intelligence-dedicated processor (for example, a neural processing unit (NPU)). The single processor or the plurality of processors may perform a control operation of processing input data according to a predefined operation rule or artificial intelligence model stored in the memory. Also, when the single processor or each of the plurality of processors is an artificial intelligence-dedicated processor, the artificial intelligence-dedicated processor may be designed as a hardware structure specialized for processing a predefined artificial intelligence model.

The predefined operation rule or artificial intelligence model may be generated through training Generating the predefined operation rule or artificial intelligence model through training means generating a predefined operation rule or artificial intelligent model set to perform a desired characteristic (or a purpose) by training a basic artificial intelligence model with a plurality of pieces of training data by a learning algorithm. The training may be performed by an apparatus of performing artificial intelligence according to the disclosure or by a separate server and/or system. The learning algorithm may be supervised learning, unsupervised learning, semi-supervised learning, or reinforcement learning, although not limited to the above-mentioned examples.

The artificial intelligence model may be configured with a plurality of neural network layers. Each of the plurality of neural network layers may have a plurality of weights, and perform neural network computation through computation between a computing result of a previous layer and the plurality of weights. The plurality of weights of the plurality of neural network layers may be optimized by a training result of the artificial intelligence model For example, the plurality of weights may be renewed or refined such that a loss value or a cost value obtained by the artificial intelligence model during a training process is reduced or minimized. An artificial neural network may include a deep neural network (DNN), and the artificial neural network may be, for example, a convolutional neural network (CNN), a deep neural network (DNN), a recurrent neural network (RNN), a restricted boltzmann machine (RBM), a deep belief network (DBN), a bidirectional recurrent deep neural network (BRDNN), or Deep Q-Networks, although not limited to the above-mentioned examples.

According to an embodiment of the disclosure, a user may control operations of the air purifier 1000 by using the mobile terminal 3000. An operation in which the mobile terminal 3000 provides information related to the air purifier 1000 to a user will be described in detail with reference to FIG. 16.

Figure 16:
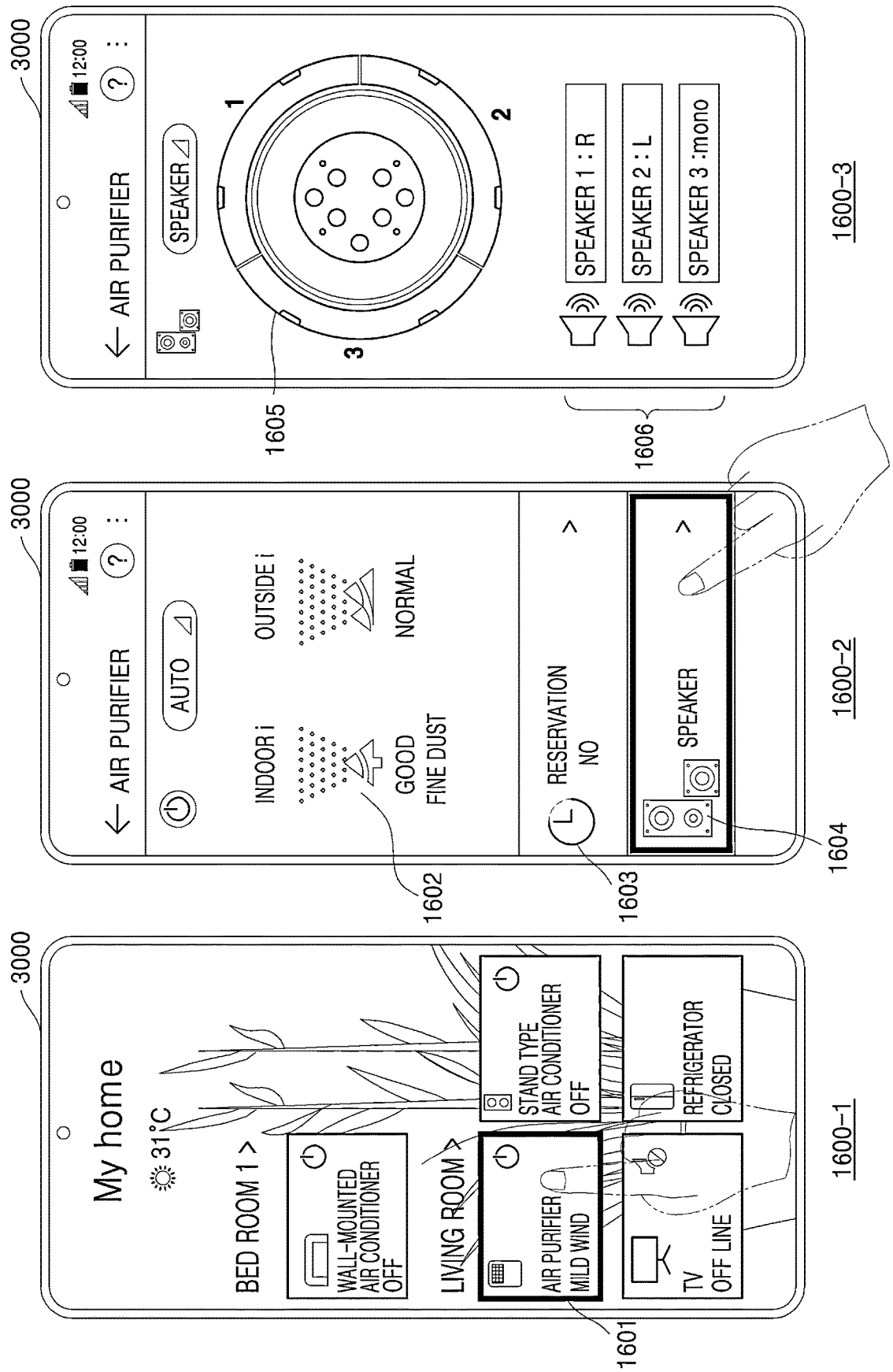
FIG. 16 is a view illustrating an operation in which a mobile terminal provides information about an air purifier, according to an aspect of the disclosure.

FIG. 16 is a view illustrating an operation in which a mobile terminal provides information about an air purifier, according to an aspect of the disclosure.

Referring to view 1600-1 of FIG. 16, the mobile terminal 3000 may display a list of a user's home appliances. The user's home appliances may be connected with the same address. For example, when a user executes a preset application for controlling home appliances on the mobile terminal 3000, the mobile terminal 3000 may display a list of icons representing an air conditioner, a refrigerator, a television, the air purifier 1000, etc. on an execution screen of the preset application. At this time, the mobile terminal 3000 may receive a user input of selecting an icon 1601 representing the air purifier 1000.

Referring to view 1600-2 FIG. 16, the mobile terminal 3000 may display an interface screen providing information about the air purifier 1000, in response to the user input of selecting the icon 1601. The interface screen may include an area 1602 for providing information about fine dust, a reservation setting icon 1603 for reserving turning-on of the air purifier 1000, a speaker icon 1604 related to the plurality of speakers 1320 installed in the air purifier 1000, etc., although not limited thereto. The mobile terminal 3000 may receive a user input of selecting the speaker icon 1604 related to the plurality of speakers 1320 on the interface screen.

Referring to view 1600-3 of FIG. 16, the mobile terminal 3000 may provide information about the plurality of speakers 1320 installed in the air purifier 1000, in response to the user input of selecting the speaker icon 1604. For example, the mobile terminal 3000 may provide a first area 1605 displaying an image representing an arrangement state of the plurality of speakers 1320, a second area 1606 displaying operation states of the plurality of speakers 1320, etc., although not limited thereto.

According to an embodiment of the disclosure, when the plurality of speakers 1320 include the first speaker 1321, the second speaker 1322, and the third speaker 1323, the mobile terminal 3000 may display an image in which each of the first speaker 1321, the second speaker 1322, and the third speaker 1323 occupies a portion of 120 degrees along the circumference of the cylindrical filter portion 1200, on the first area 1605.

Also, when the first speaker 1321 is used as a right channel speaker, the second speaker 1322 is used as a left channel speaker, and the third speaker 1323 is used as a mono channel speaker, the mobile terminal 3000 may display information such as "speaker 1:R, speaker 2:L, speaker 3:mono" on the second area 1606. When the operation states of the plurality of speakers 1320 change, content displayed on the second area 1606 may also change.

Meanwhile, when the user selects an icon related to the first speaker 1321 from a speaker image displayed on the first area 1605 or a speaker list displayed on the second area 1606, the mobile terminal 3000 may provide a GUI for enabling the user to control a volume of the first speaker 1321. In this case, the user may control the volume of the first speaker 1321 through the GUI.

According to an embodiment of the disclosure, when the user controls a function of the air purifier 1000 through the interface screen of the mobile terminal 3000, the mobile terminal 3000 may transmit control information corresponding to the user's control to the air purifier 1000. At this time, the mobile terminal 3000 may directly transmit the control information to the air purifier 1000 through short-range wireless communication. Also, the mobile terminal 3000 may indirectly transmit the control information to the air purifier 1000 via the server device 2000.

According to an embodiment of the disclosure, the user may easily control the air purifier 1000 and the plurality of speakers 1320 installed in the air purifier 1000 by using the mobile terminal 3000.

Figure 17:
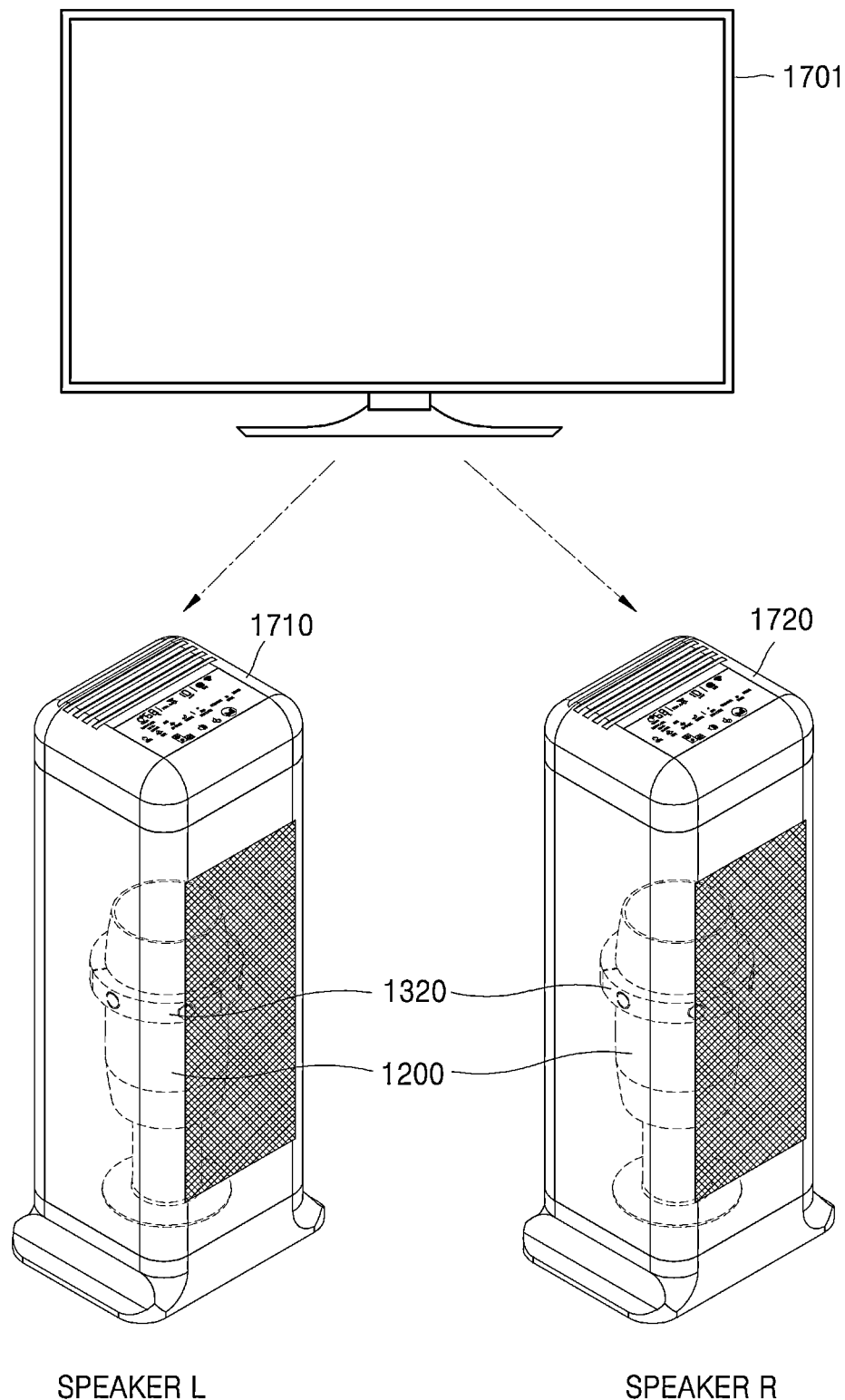
FIG. 17 is a view illustrating an operation in which a plurality of air purifiers, according to an aspect of the disclosure, output sound.

FIG. 17 is a view illustrating an operation in which a plurality of air purifiers, according to an aspect of the disclosure, output sound.

A sound output system according to an embodiment of the disclosure may include a plurality of air purifiers (for example, a first air purifier 1710 and a second air purifier 1720). At this time, each of the first air purifier 1710 and the second air purifier 1720 may include the plurality of speakers 1320 arranged along the circumference of the cylindrical filter portion 1200. According to an embodiment of the disclosure, the first air purifier 1710 and the second air purifier 1720 may be connected to a TV 1701. When content is reproduced on the TV 1701, each of the first air purifier 1710 and the second air purifier 1720 may output sound corresponding to the content.

According to an embodiment of the disclosure, the first air purifier 1710 of the plurality of air purifiers may operate as a left channel speaker, and the second air purifier 1720 may operate as a right channel speaker. In this case, the first air purifier 1710 may output a left sound signal through the plurality of speakers 1320 positioned in the first air purifier 1710, and the second air purifier 1720 may output a right sound signal through the plurality of speakers 1320 positioned in the second air purifier 1720. According to an embodiment of the disclosure, the first air purifier 1710 may output a left sound signal through all of the plurality of speakers 1320 of the first air purifier 1710, or may output a left sound signal through one speaker and a mono sound signal through the remaining speakers. According to an embodiment of the disclosure, the second air purifier 1720 may output a right sound signal through all of the plurality of speakers 1320 of the second air purifier 1720, or may output a right sound signal through one speaker and a mono sound signal through the remaining speakers.

According to an embodiment of the disclosure, the first air purifier 1710 and the second air purifier 1720 may transmit/receive data to/from each other through short-range wireless communication. According to an embodiment of the disclosure, one of the first air purifier 1710 and the second air purifier 1720 may operate as a main air purifier, and the other one may operate as a sub air purifier. For example, the first air purifier 1710 may operate as a main air purifier, and the second air purifier 1720 may operate as a sub air purifier. In this case, the first air purifier 1710 may determine operation states of all speakers included in the first air purifier 1710 and the second air purifier 1720.

Figure 18:
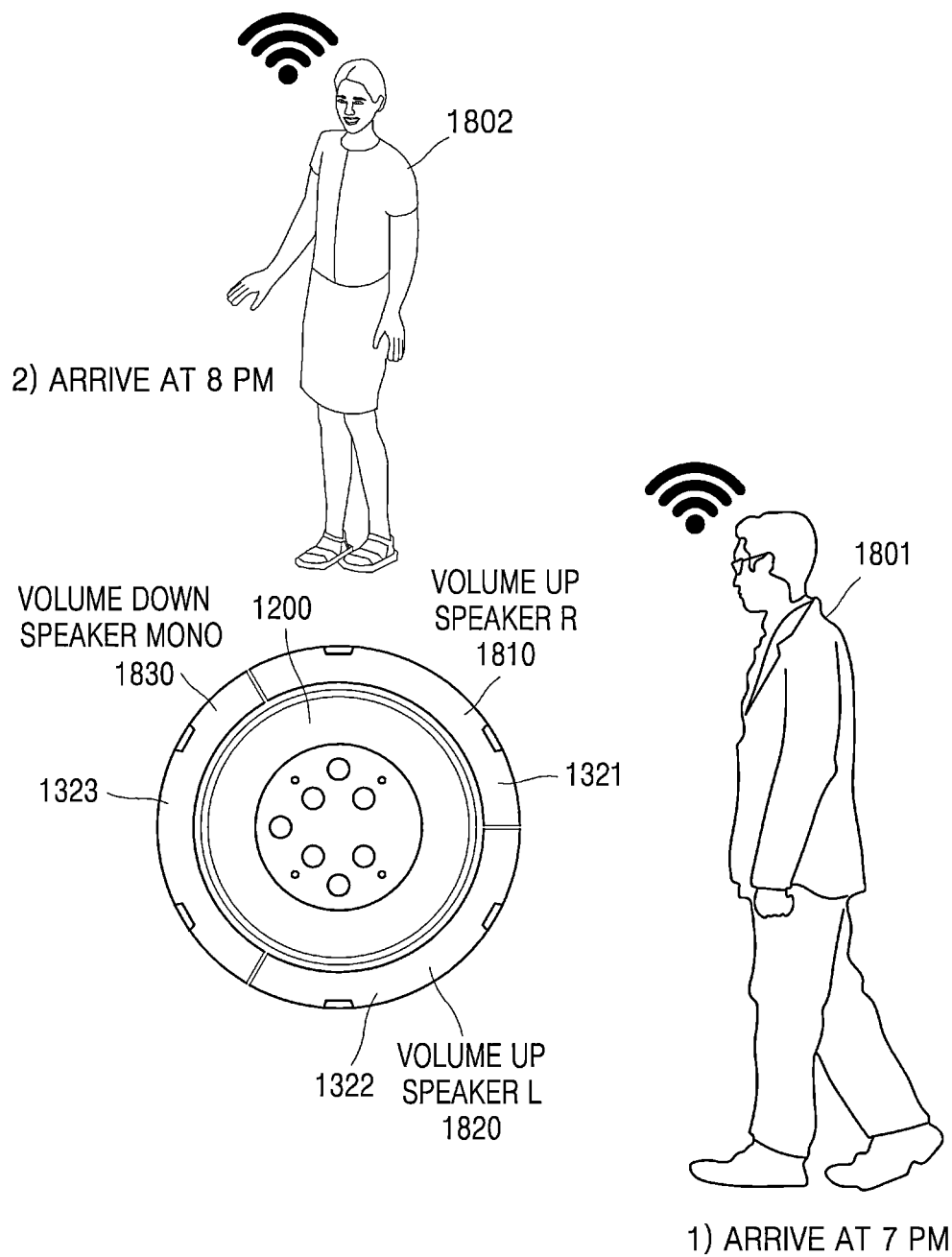
FIG. 18 is a view illustrating an operation in which an air purifier controls a plurality of speakers when a plurality of users are sensed, according to an aspect of the disclosure.

FIG. 18 is a view illustrating an operation in which an air purifier controls a plurality of speakers when a plurality of users are sensed, according to an aspect of the disclosure.

According to an embodiment of the disclosure, the air purifier 1000 may sense a plurality of users located around the air purifier 1000 through the human body sensor 1610. For example, when a first user 1801 comes home at 7 o'clock and then a second user 1802 comes home at 8 o'clock, the air purifier 1000 may sense all of the first user 1801 and the second user 1802 located nearby at 8 o'clock.

According to an embodiment of the disclosure, when a plurality of users are sensed, the air purifier 1000 may determine operation states of the plurality of speakers 1320 based on a location of a user sensed first. For example, a case in which the first user 1801 is sensed earlier than the second user 1802 by the human body sensor 1610 and the first user 1801 is currently located between the first speaker 1321 and the second speaker 1322 is assumed. In this case, the air purifier 1000 may determine the first speaker 1321 and the second speaker 1322 located close to the first user 1801 to be a right channel speaker 1810 and a left channel speaker 1820, and determine the third speaker 1323 that is opposite to the first user 1801 to be a mono channel speaker 1830, based on a location of the first user 1801 sensed first. Also, the air purifier 1000 may raise volumes of the first speaker 1321 and the second speaker 1322 located close to the first user 1801, and reduce a volume of the third speaker 1323 that is opposite to the first user 1801, based on the location of the first user 1801.

According to an embodiment of the disclosure, the air purifier 1000 may determine operation states of the plurality of speakers 1320 based on a location of a user of which a mobile terminal is first connected to the air purifier 1000 through short-range wireless communication, among a plurality of users. For example, when a first mobile terminal of the first user 1801 is connected to the air purifier 1000 at 7 o'clock through Bluetooth communication and a second mobile terminal of the second user 1802 is connected to the air purifier 1000 at 8 o'clock through Bluetooth communication, the air purifier 1000 may determine operation states of the plurality of speakers 1320 based on a location of the first user 1801.

According to an embodiment of the disclosure, the air purifier 1000 may determine operation states of the plurality of speakers 1320, based on a location of a user of which a mobile terminal is first connected to an access point (AP) in home among a plurality of users. In this case, the air purifier 1000 may have been connected in advance to the AP in home in advance. For example, when the first mobile terminal of the first user 1801 is connected to the AP at 7 o'clock and the second mobile terminal of the second user 1802 is connected to the AP at 8 o'clock, the air purifier 1000 may determine operation states of the plurality of speakers 1320 based on a location of the first user 1801.

According to an embodiment of the disclosure, when the first user 1801 among the plurality of users goes out, the air purifier 1000 may determine operation states of the plurality of speakers 1320 based on a location of the second user 1802 left alone. For example, when the second user 1802 is currently located between the first speaker 1321 and the third speaker 1323, the air purifier 1000 may determine the first speaker 1321 and the third speaker 1323 located close to the second user 1802 to be a right channel speaker 1810 and a left channel speaker 1820, and the second speaker 1322 that is opposite to the second user 1802 to be a mono channel speaker 1830, based on a location of the second user 1802. Also, the air purifier 1000 may raise volumes of the first speaker 1321 and the third speaker 1323 located close to the second user 1802, and reduce a volume of the second speaker 1322 that is opposite to the second user 1802, based on the location of the second user 1802.

Figure 19:
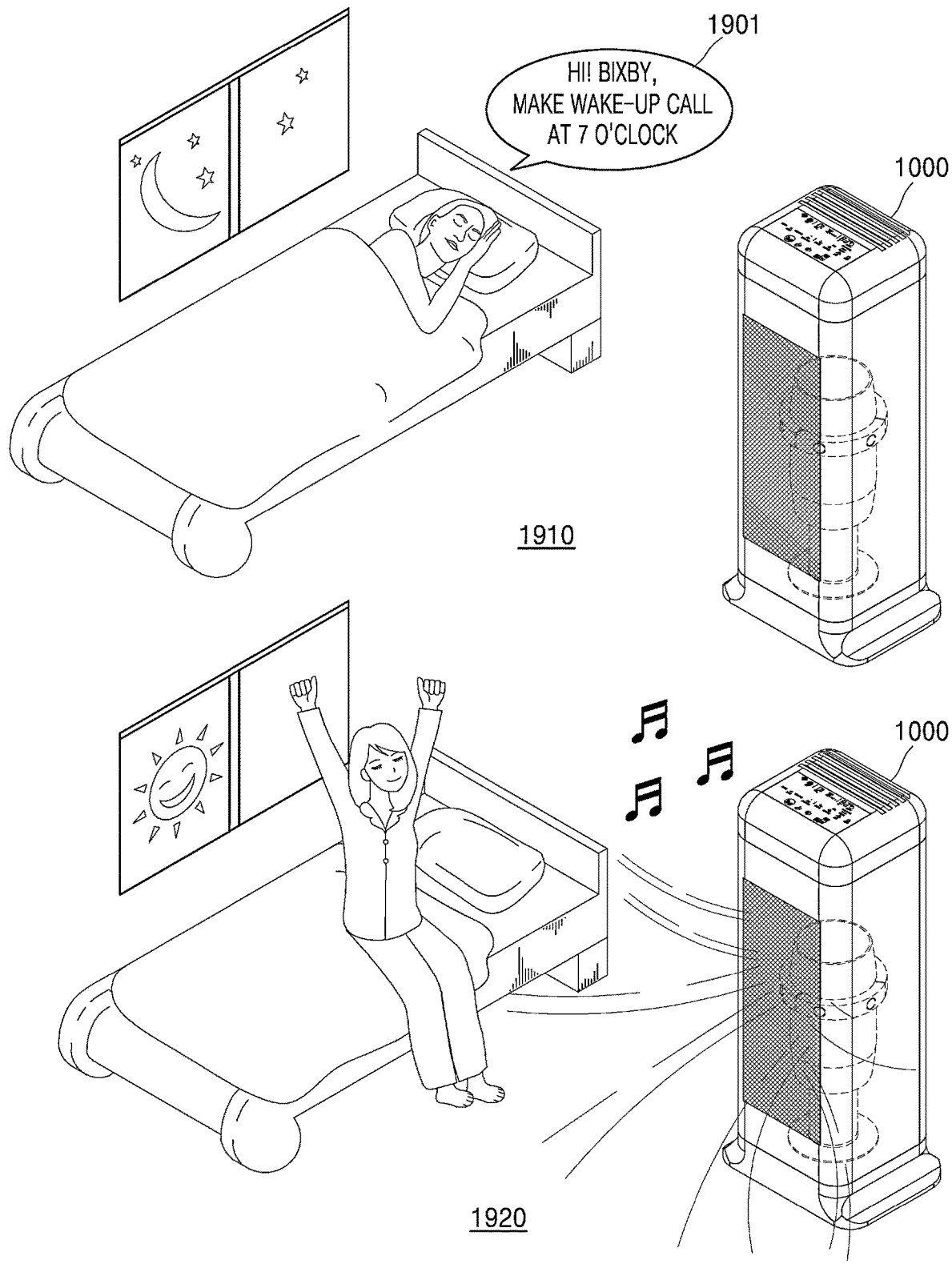
FIG. 19 is a view illustrating an operation of providing a wake-up call function in an air purifier, according to an aspect of the disclosure.

FIG. 19 is a view illustrating an operation of providing a wake-up call function in an air purifier, according to an aspect of the disclosure.

Referring to 1910 of FIG. 19, the air purifier 1000 may receive a user input of setting a wake-up call. For example, the air purifier 1000 may receive a voice input 1901 of 'Hi! Bixby, make a wake-up call at 7 o'clock'. In this case, the air purifier 1000 may make a setting of outputting a wake-up call alarm at 7 o'clock a.m. through the plurality of speakers 1320 and operating the blow portion 1100 and the filter portion 1200 at 7 o'clock a.m., based on the voice input 1901.

Referring to 1920 of FIG. 19, at 7 o'clock a.m., the air purifier 1000 may output preset music through the plurality of speakers 1320. The preset music may be music selected in advance by a user or music stored in advance in the memory 1800 for a wake-up call.

According to an embodiment of the disclosure, the air purifier 1000 may switch an operation mode from an inactive mode to an active mode, and operate the blow portion 1100 and the filter portion 1200. According to an embodiment of the disclosure, the air purifier 1000 may operate the blow portion 1100 with a preset air volume. For example, the air purifier 1000 may operate the blow fan 1100 with an air volume 'strong' for 10 minutes at 7 o'clock a.m., and automatically adjust an air volume according to a degree of air pollution after 10 minutes elapses.

Figure 20:
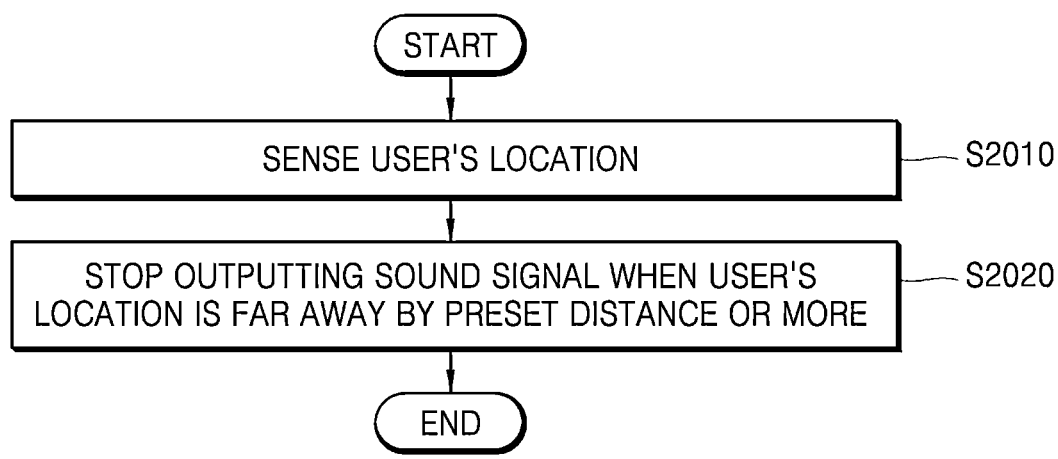
FIG. 20 is a flowchart illustrating a method of stopping outputting a sound signal, in an air purifier, according to an aspect of the disclosure.

FIG. 20 is a flowchart illustrating a method of stopping outputting a sound signal, in an air purifier, according to an aspect of the disclosure.

In operation S2010, the air purifier 1000 according to an embodiment of the disclosure may sense a user's location. According to an embodiment of the disclosure, the air purifier 1000 may recognize the user's location by using the human body sensor 1610. For example, the human body sensor 1610 may track a direction in which a user's operation is sensed, and recognize which one of the plurality of speakers 1320 the user is located close to. Also, the human body sensor 1610 may count the number of persons existing within a preset range. For example, the human body sensor 1610 may sense the number of persons located around the air purifier 1000.

In operation S2020, the air purifier 1000 according to an embodiment of the disclosure may stop outputting a sound signal when the user's location is far away from the air purifier 1000 by a preset distance or more.

According to an embodiment of the disclosure, when the user is far away from the air purifier 1000 by a preset distance or more, the user may not hear sound output from the plurality of speakers 1320. Therefore, outputting sound from the plurality of speakers 1320 may be meaningless. Accordingly, the air purifier 1000 may change an operation mode of the plurality of speakers 1320 from the active mode to the inactive mode to save power. An operation of changing an operation mode of the plurality of speakers 1320 from the active mode to the inactive mode in the air purifier 1000 will be described in more detail with reference to FIG. 21.

Figure 21:
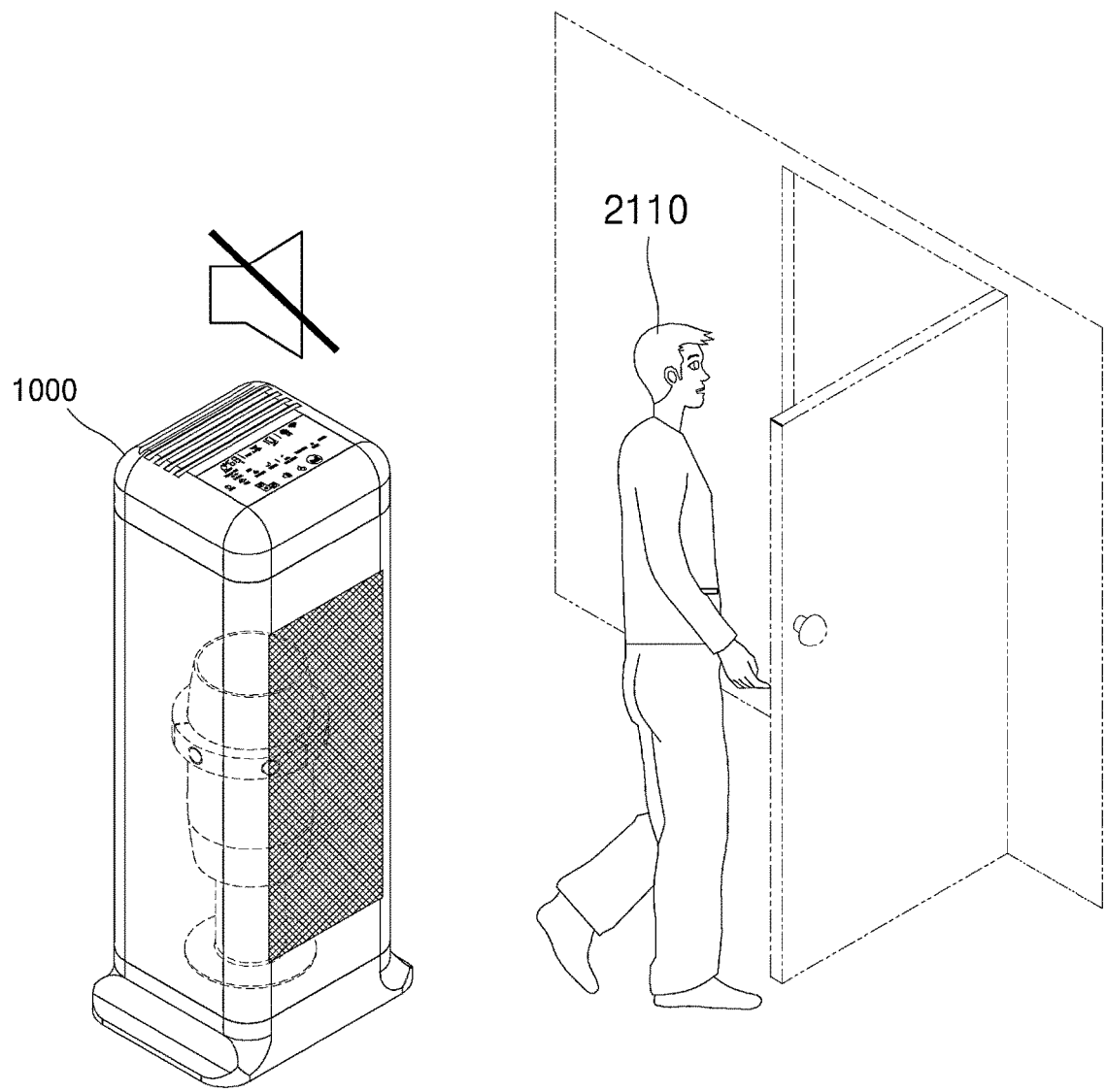
FIG. 21 is a view illustrating an operation in which an air purifier according to an aspect of the disclosure stops outputting a sound signal based on a user's location.

FIG. 21 is a view illustrating an operation in which an air purifier according to an aspect of the disclosure stops outputting a sound signal based on a user's location.

According to an embodiment of the disclosure, while sound is output through the plurality of speakers 1320 in the air purifier 1000, a user 2110 may go out without turning off the air purifier 1000. In this case, because the air purifier 1000 senses no user within a preset range (for example, a radius of 50 m), the air purifier 1000 may switch an operation mode of the plurality of speakers 1320 from the active mode to the inactive mode, and stop outputting a sound signal through the plurality of speakers 1320.

Meanwhile, because a degree of indoor air pollution changes regardless of existence or nonexistence of the user 2110, the air purifier 1000 may maintain operation modes of the blow portion 1100 and the filter portion 1200 in an active mode.

According to an embodiment of the disclosure, the air purifier 1000 may output sound by using the plurality of speakers 1320 to thereby attenuate vibrations generated from the plurality of speakers 1320. Particularly, the air purifier 1000 according to an embodiment of the disclosure may output sound through the plurality of speakers 1320 arranged at 360 degrees along the circumference of the outer surface of the cylindrical filter portion 1200, thereby enabling a user to stably hear undistorted sound in all directions.

Also, the air purifier 1000 according to an embodiment of the disclosure may provide a stereophonic service through the plurality of speakers 1320. Particularly, the air purifier 1000 may provide a high quality stereophonic service based on a user's location.

The method according to an embodiment of the disclosure may be implemented in a form of a program command that can be executed through various computer means, and may be recorded on computer-readable media. The computer-readable media may also include, alone or in combination with program commands, data files, data structures, and the like. Program commands recorded on the media may be the kind specifically designed and constructed for the disclosure or well-known and available to those of ordinary skill in the computer software field. Examples of the computer-readable media include magnetic media, such as hard disks, floppy disks, and magnetic tapes, optical media, such as CD-ROM and DVD, magneto-optical media such as floptical disks, and hardware devices, such as ROM, RAM, flash memory, and the like, specifically configured to store and execute program commands. Examples of the program commands include high-level language codes that can be executed on a computer through an interpreter or the like, as well as machine language codes produced by a compiler.

A computer-readable recording medium according to an aspect of the disclosure has stored therein a program for obtaining stereophonic information from an external device; determining a first speaker of a plurality of speakers arranged along a circumference of an outer surface of a cylindrical filter portion installed in an air purifier to be a right channel speaker, and determining a second speaker from among the plurality of speakers to be a left channel speaker; outputting a right sound signal through the first speaker, based on the stereophonic information; and outputting a left sound signal through the second speaker, based on the stereophonic information.

Some embodiments of the disclosure may be implemented in the form of a computer-readable recording medium including an instruction that is executable by a computer, such as a program module that is executed by a computer. The computer-readable recording medium may be an arbitrary available medium which can be accessed by a computer, and may include a volatile or non-volatile medium and a separable or non-separable medium. Further, the computer-readable recording medium may include a computer storage medium and a communication medium. The computer storage medium may include volatile and non-volatile media and separable and non-separable media implemented by an arbitrary method or technology for storing information, such as a computer-readable instruction, a data structure, a program module, or other data. The communication medium may generally include a computer-readable instruction, a data structure, a program module, other data of a modulated data signal such as a carrier wave, or another transmission mechanism, and include an arbitrary information transmission medium. Also, some embodiments of the disclosure may be implemented as a computer program or a computer program product including instructions that are executable by a computer, such as a computer program being executed by a computer.

Machine-readable storage media may be provided in the form of non-transitory storage media. Herein, 'non-transitory storage media' means that the storage media do not include a signal (e.g., electromagnetic waves) and are tangible, without meaning that data is semi-permanently or temporarily stored in the storage media. For example, 'non-transitory storage media' may include a buffer in which data is temporarily stored.

The method according to an embodiment of the disclosure may be included in a computer program product and provided. The computer program product may be traded between a seller and a purchaser. The computer program product may be distributed in the form of a machine-readable storage medium (e.g., a compact disc read only memory CD-ROM). Alternatively, the computer program product may be distributed (e.g., downloaded or uploaded) online through an application store or directly between two user devices (e.g., smartphones). In online distribution, at least a portion of the computer program product may be temporarily or provisionally stored in a machine-readable storage medium, for example, a server of a manufacturing company, a server of an application store, or a memory of a relay server.

Although the embodiments of the disclosure have been described in detail, the scope of rights of the disclosure is not limited to these embodiments of the disclosure. It will be understood that various modifications and variations may be made by those skilled in the art based on the fundamental concept of the disclosure as defined by the appended claims.

The invention claimed is:

1. An air purifier comprising:
a cylindrical filter configured to filter air that enters the air purifier;
a plurality of speakers coupled to a circumference of an outer surface of the cylindrical filter, wherein the plurality of speakers includes n speakers, and each speaker of the plurality of speakers has a contact area with the outer surface of 360/n degrees;
a communication interface configured to receive information from an external device; and
a processor configured to control the plurality of speakers to output an audio signal corresponding to the received information.

2. The air purifier of claim 1, wherein
the received information includes stereophonic sound information, and
the processor is further configured to control the plurality of speakers to output a stereophonic audio signal corresponding to the stereophonic sound information included in the received information.

3. The air purifier of claim 1, further comprising:
a sensor coupled to the processor and configured to sense a user's location.

4. The air purifier of claim 3, wherein
the plurality of speakers include a first speaker, a second speaker, and a third speaker, and the sensor is a human body sensor, and
the processor is further configured to control the first speaker to output a left sound signal, control the second speaker to output a right sound signal, and control the third speaker to output a mono sound signal, based on the user's location sensed by the human body sensor.

5. The air purifier of claim 4, wherein the processor is further configured to adjust an output intensity of each of the plurality of speakers based on the user's location sensed by the human body sensor.

6. The air purifier of claim 5, wherein the processor is further configured to, when the first speaker and the second speaker of the plurality of speakers are determined to be speakers located closest to the user's location, increase output intensities of the first speaker and the second speaker, and reduce an output intensity of the third speaker.

7. The air purifier of claim 1, wherein
the plurality of speakers include a plurality of full-range speakers, and
the air purifier further comprising:
a woofer speaker coupled below the cylindrical filter.

8. The air purifier of claim 1, wherein the processor is further configured to determine a change of an air volume output by the air purifier, determine a change in noise level based on the determined change of the air volume, and adjust output intensities of the plurality of speakers based on the determined change in noise level.

9. The air purifier of claim 1, wherein the processor is further configured to determine a frequency band of a changed noise level of the air purifier based on a change in air volume output by the air purifier, and to adjust an output intensity of the audio signal based on the determined frequency band.

* * * * *